(12) United States Patent
Kasai et al.

(10) Patent No.: US 10,482,568 B2
(45) Date of Patent: Nov. 19, 2019

(54) INFORMATION PROCESSOR AND INFORMATION PROCESSING METHOD

(71) Applicant: SONY CORPORATION, Tokyo (JP)

(72) Inventors: Kouichi Kasai, Saitama (JP); Takanori Minamino, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 152 days.

(21) Appl. No.: 14/907,549

(22) PCT Filed: Feb. 24, 2015

(86) PCT No.: PCT/JP2015/055295
§ 371 (c)(1),
(2) Date: Jan. 25, 2016

(87) PCT Pub. No.: WO2015/182189
PCT Pub. Date: Dec. 3, 2015

(65) Prior Publication Data
US 2016/0180496 A1    Jun. 23, 2016

(30) Foreign Application Priority Data

May 28, 2014 (JP) ................................ 2014-109803

(51) Int. Cl.
| | |
|---|---|
| *G06T 1/60* | (2006.01) |
| *G09G 5/00* | (2006.01) |
| *G09G 5/393* | (2006.01) |
| *G09G 5/395* | (2006.01) |

(52) U.S. Cl.
CPC .............. *G06T 1/60* (2013.01); *G09G 5/001* (2013.01); *G09G 5/393* (2013.01); *G09G 5/395* (2013.01); *G09G 2340/02* (2013.01); *G09G 2340/0435* (2013.01); *G09G 2350/00* (2013.01); *G09G 2370/02* (2013.01)

(58) Field of Classification Search
CPC .. G06T 1/60; G09G 2340/02; G09G 2350/00; G09G 5/001; G09G 5/393; G09G 5/395
See application file for complete search history.

(56) References Cited

U.S. PATENT DOCUMENTS

| | | | |
|---|---|---|---|
| 8,692,937 B2* | 4/2014 | Altmann ................ | H04N 9/475 345/1.3 |
| 2003/0025648 A1* | 2/2003 | Glen ..................... | G06F 3/1438 345/2.3 |
| 2007/0057952 A1* | 3/2007 | Swedberg ............... | G09G 5/00 345/474 |

(Continued)

*Primary Examiner* — Michael Le
(74) *Attorney, Agent, or Firm* — Chip Law Group

(57) ABSTRACT

Provided is a device and a method that are capable of display control of image data, which is received through a communication unit, with a small delay. An image frame, and memory input time and transmission frame rate information that serve as metadata are stored in the memory storing the image frame. The display control unit selects the image that is output to the display unit on the basis of the elapsed time from the input time information. The waiting time, which is the elapsed time from the time of input, and the buffering time are compared with each other in each of the queues, and the image frame corresponding to the newest queue, which is a queue among the queues in which the waiting time exceeds the buffering time, is selected as the output image to the display unit.

14 Claims, 22 Drawing Sheets

(56) References Cited

U.S. PATENT DOCUMENTS

| | | | |
|---|---|---|---|
| 2009/0109988 A1* | 4/2009 | Musunuri | G06F 3/14 370/412 |
| 2012/0207215 A1* | 8/2012 | Ryu | G11B 20/10527 375/240.12 |
| 2013/0063447 A1* | 3/2013 | Matsui | H04L 67/36 345/473 |
| 2013/0166769 A1* | 6/2013 | Chang | G06F 3/1454 709/231 |
| 2013/0222210 A1* | 8/2013 | Wang | H04N 21/4307 345/2.3 |

* cited by examiner

INFORMATION PROCESSOR AND INFORMATION PROCESSING METHOD

TECHNICAL FIELD

The present disclosure relates to an information processor, an information processing method, and a program. In further detail, the present disclosure relates to an information processor, an information processing method, and a program that enables display of an image data sent from the server to be executed with a small delay.

BACKGROUND ART

Recently, a so-called cloud computing system that transmits a data processing request from a client such as, for example a portable terminal, to a server, executes data processing on the server side and returns a processing result to the client, and obtains the data processing result on the client side is starting to become widely used.

An example of the utilization of the cloud system includes execution of games on a game terminal. It is a system in which a game terminal (a client) that a user operates communicates with a server, and by the use of a high-function data processing function on the server side, image data such as a developing display of the game is provided to the client.

In such a cloud based game system, user operation information is transmitted from the client to the server. The server develops the game according to the operation information sent from the client, generates updated image and audio data, and transmits the updated image and audio data to the client. The client reproduces the updated image and audio sent from the server. By performing such a process, even a client that is not equipped with a high function processor and the like is capable of obtaining the data processing results using the server-side high-function data processing function.

However, when the transfer data between the server and the client is data with a large data size such as image data, delays and jitters (fluctuation) occur according to the state of the network. Typically, image and audio data needs to be transmitted as coded data, the client needs to store the received coded data in a buffer, and the coded data needs to be sequentially decoded and output.

When a packet delay and a jitter (fluctuation) occur according to the state of the network, delays in reception of the packet, decoding, display, and the sequential process of the above occur on the client side and, as a result, there are cases in which a timely image display cannot be performed in the client.

Note that as a known technology, for example, Patent Literature 1 (JP 2005-159787A) discloses processing that sequentially decodes and displays data stored in a buffer.

CITATION LIST

Patent Literature

Patent Literature 1: JP 2005-159787A

SUMMARY OF INVENTION

Technical Problem

In a cloud system described above, when decoding and displaying the image data that the client receives from the server, there is a possibility of a delay occurring, and such a delay is, in a case of a game machine or the like, for example, reflected as degradation in the responsiveness of the user operation and, accordingly, reduces the fun of the game by half.

The present disclosure is, for example, made in view of the above problem and an object thereof is to provide an information processor, an information processing method, and a program that achieve data output in which delay is reduced.

Solution to Problem

According to a first aspect of the present disclosure, there is provided an information processor including: a decoder configured to execute processing of decoding encoded image data received by a communication unit; a memory configured to store an image frame that has already been decoded and that the decoder outputs; and a display control unit configured to acquire the image frame stored in the memory and output the image frame to a display unit. The memory stores, in addition to the image frame, time in which the image frame has been input to the memory as metadata. The display control unit selects an output image to the display unit on a basis of elapsed time from the time of input.

According to a second aspect of the present disclosure, there is provided an information processing method executed in an information processor, the information processing method including: a decoding processing step in which a decoder executes processing of decoding encoded image data received by a communication unit; an image frame storing step in which an output controller stores an image frame that has already been decoded and that is output by the decoder to a memory; and a display controlling step in which a display control unit acquires the image frame stored in the memory and outputs the image frame to a display unit. The image frame storing step is executed as a step of storing in the memory, in addition to the image frame, time of input of the image frame to the memory as metadata. The display controlling step includes a step of selecting an output image to the display unit on a basis of elapsed time from the time of input.

According to a third aspect of the present disclosure, there is provided a program for causing an information processor to execute information processing of: a decoding processing step that makes a decoder execute processing of decoding encoded image data received by a communication unit; an image frame storing step that makes an output controller store an image frame that has already been decoded and that is output by the decoder to a memory; and a display controlling step that makes a display control unit acquire the image frame stored in the memory and output the image frame to a display unit. In the image frame storing step, the memory is made to store, in addition to the image frame, time of input of the image frame to the memory as metadata. In the display controlling step, an output image to the display unit is made to be selected on a basis of elapsed time from the time of input.

Note that the program according to the present disclosure is a program that can be provided in a storage medium or communication medium that is provided in a computer-readable form for an information processing device or a computer system that is capable of executing various types of program code, for example. Providing this sort of program in a computer-readable form makes it possible to implement the processing according to the program in the information processing device or the computer system.

The object, features, and advantages of the present disclosure will be made clear later by a more detailed explanation that is based on the embodiments of the present disclosure and the appended drawings. Furthermore, the system in this specification is not limited to being a configuration that logically aggregates a plurality of devices, all of which are contained within the same housing.

Advantageous Effects of Invention

According to a configuration of an embodiment of the present disclosure, a device and a method are provided that is capable of display control of image data, which is received through a communication unit, with a small delay.

Specifically, an image frame, and memory input time and transmission frame rate information that serve as metadata are stored in the memory storing the image frame. The display control unit selects the output image to the display unit on the basis of the elapsed time from the input time information. The waiting time, which is the elapsed time from the input time, and the buffering time are compared with each other in each of the queues, and the image frame associated with the newest queue, which is a queue among the queues in which the waiting time exceeds the buffering time, is selected as the output image to the display unit. Furthermore, when there is a change in the transmission frame rate, the display rate of the display unit is changed in addition to the change in the transmission frame rate.

With the present configuration, a device and a method are provided that is capable of display control of image data, which is received through a communication unit, with a small delay.

Note that the effects described in the present description are only exemplifications and the effects are not limited to those described in the present description and, further, there may be additional effects.

DESCRIPTION OF EMBODIMENTS

Hereinafter, details of an information processor, an information processing method, and a program of the present disclosure will be described with reference to the drawings. Note that the description will be made according to the following items.

1. Exemplary Configuration of Communication System
2. Delay in Reception, Decoding, and Output Process of Image Data
3. Outline of Configuration and Processing of Information Processor of Present Disclosure
4. Memory Storing Sequence of Decoded Image Executed by Information Processor (Client) of Present Disclosure
5. Detailed Sequence of Image Display Control Processing Executed by Information Processor (Client) of Present Disclosure
   5-1. Processing in Display Update Stopped State (Uninitialized)
   5-2. Processing in Display Update Executing State (Initialized)
6. Processing in response to Switching of Image Transmission Frame Rate (fps) of Server
   6-1. Basic Display Control Processing Executed by Client When Transmission Frame Rates (fps) are 60 fps and 30 fps
   6-2. Display Control Processing Executed by Client When Transmission Frame Rates (fps) are Changed from 60 fps to 30 fps
   6-3. Display Control Processing Executed by Client When Transmission Frame Rates (fps) are Changed from 30 fps to 60 fps 7. Exemplary Configuration of Information Processor Serving as Client 8. Conclusion of Configuration of Present Disclosure

[1. Exemplary Configuration of Communication System]

Figure 1:
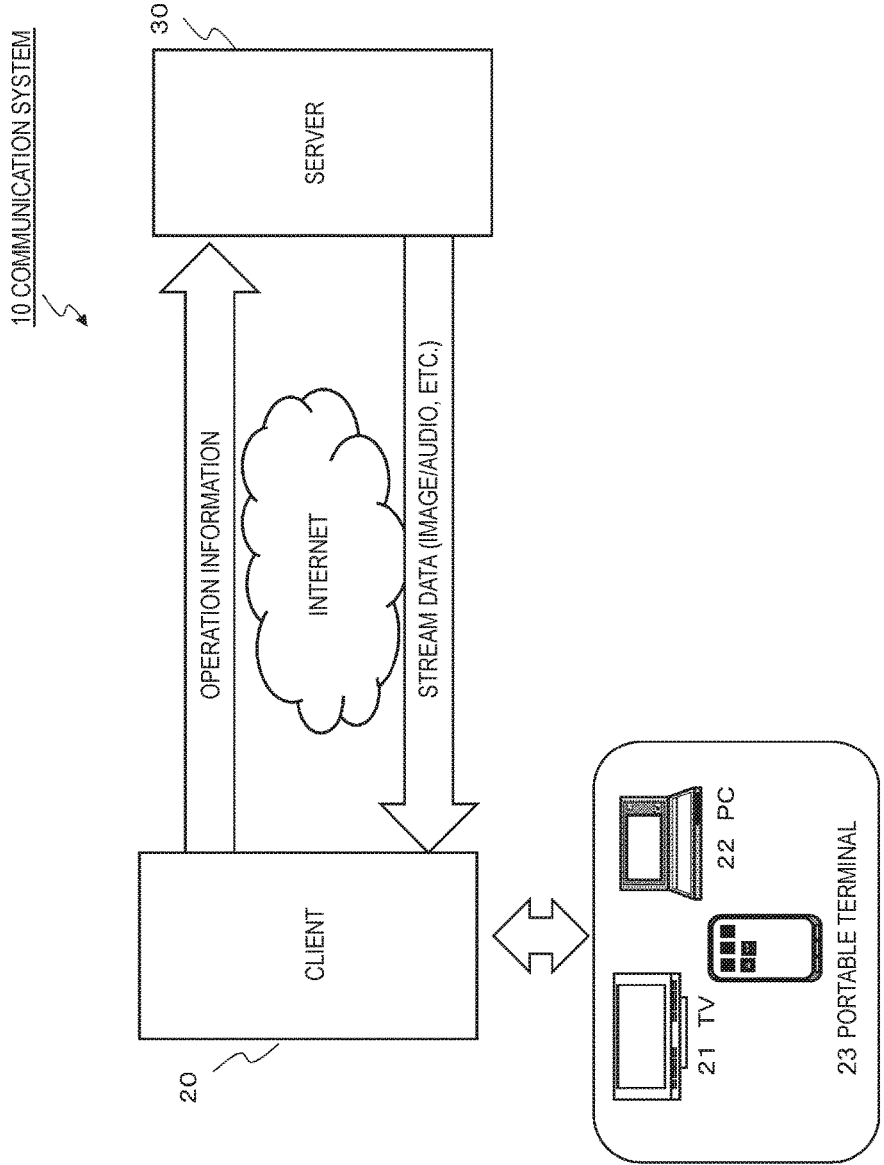
FIG. 1 is a diagram for describing an exemplary configuration of a communication system that executes processing of the present disclosure.

Referring first to FIG. 1, an exemplary configuration of a communication system that executes the processing of the present disclosure will be described.

As illustrated in FIG. 1, a communication system 10 includes a client 20 and a server 30 that are capable of bidirectional communication. The client 20 and the server 30 perform communication through a network such as the Internet, for example.

The client 20 is a device for a general user and, specifically, is a television 21, a PC 22, a game machine, or a portable terminal 23 such as a smart phone, for example.

The client 20 transmits user operation information on the client 20 to the server 30. The server 30 performs data processing in response to the received operation information from the client 20. For example, when the user is in the midst of playing a game with the client 20, the game is developed in accordance with the user operation and stream data in which the updated image and audio data are coded is generated and is transmitted to the client 20.

The client 20 decodes the stream data sent from the server 30 and outputs the image and audio, which are results of the decoding, through a display or a loudspeaker.

[2. Delay in Reception, Decoding, and Output Process of Image Data]

In the communication system 10, such as the one illustrated in FIG. 1, a delay and a jitter (fluctuation) are generated in the communication data between the client 20 and the server 30 in accordance with the network state. Typically, image and audio data needs to be transmitted as coded data, the client 20 needs to store the received coded data in a buffer, and the coded data needs to be sequentially decoded and output.

When a packet delay and a jitter (fluctuation) occur, delays in reception of the packet, decoding, display, and the sequential process of the above occur on the client 20 side and, as a result, there are cases in which a timely image display cannot be performed in the client 20.

A specific example of the occurrence of a delay will be described with reference to FIGS. 2 and 3.

Figure 2:
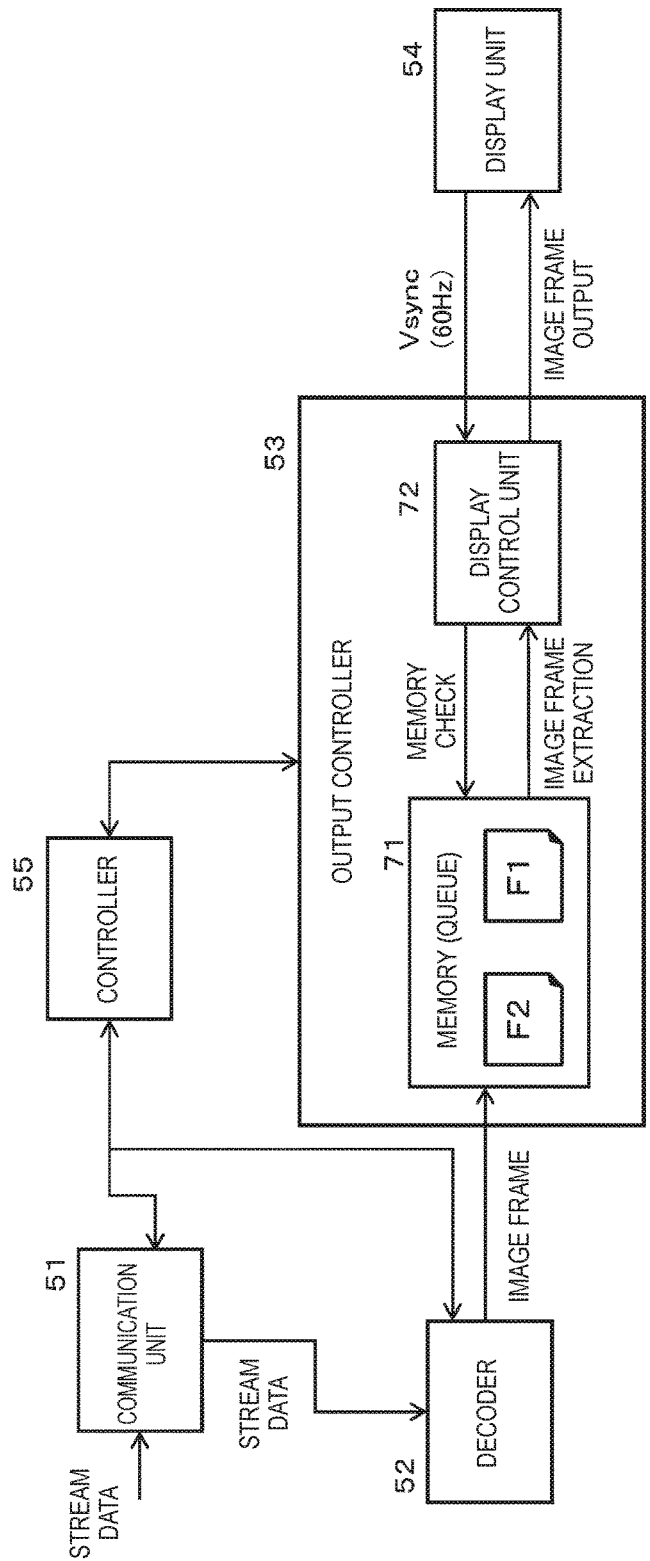
FIG. 2 is a diagram for describing a configuration of a typical client.

FIG. 2 is a diagram illustrating an exemplary configuration of a typical client 20.

A communication unit 51 receives stream data including image coded data and audio coded data transmitted by the server 30.

The received data is decoded in a decoder 52.

Note that processing of the image data will be described below.

The decoded image data is stored in a memory 71 of an output controller 53 in units of an image frame.

The memory 71 is configured so as to be capable of storing a plurality of image frames as a queue.

Herein, the memory 71 is configured so as to be capable of storing two image frames (indicated as F1 and F2 in the drawing).

The display control unit 72 sequentially acquires image frames that have been decoded and that have been stored in the memory 71 and outputs the image frames to the display unit 54.

The display unit 54 outputs, for example, a 60 Hz vertical synchronizing signal (Vsync) to the display control unit 72, and, at a timing determined on the basis of the synchronizing signal, the display control unit 72 sequentially outputs the image frames to the display unit 54 and executes an image update.

A controller 55 performs a general control related to processing of each component.

Figure 3:
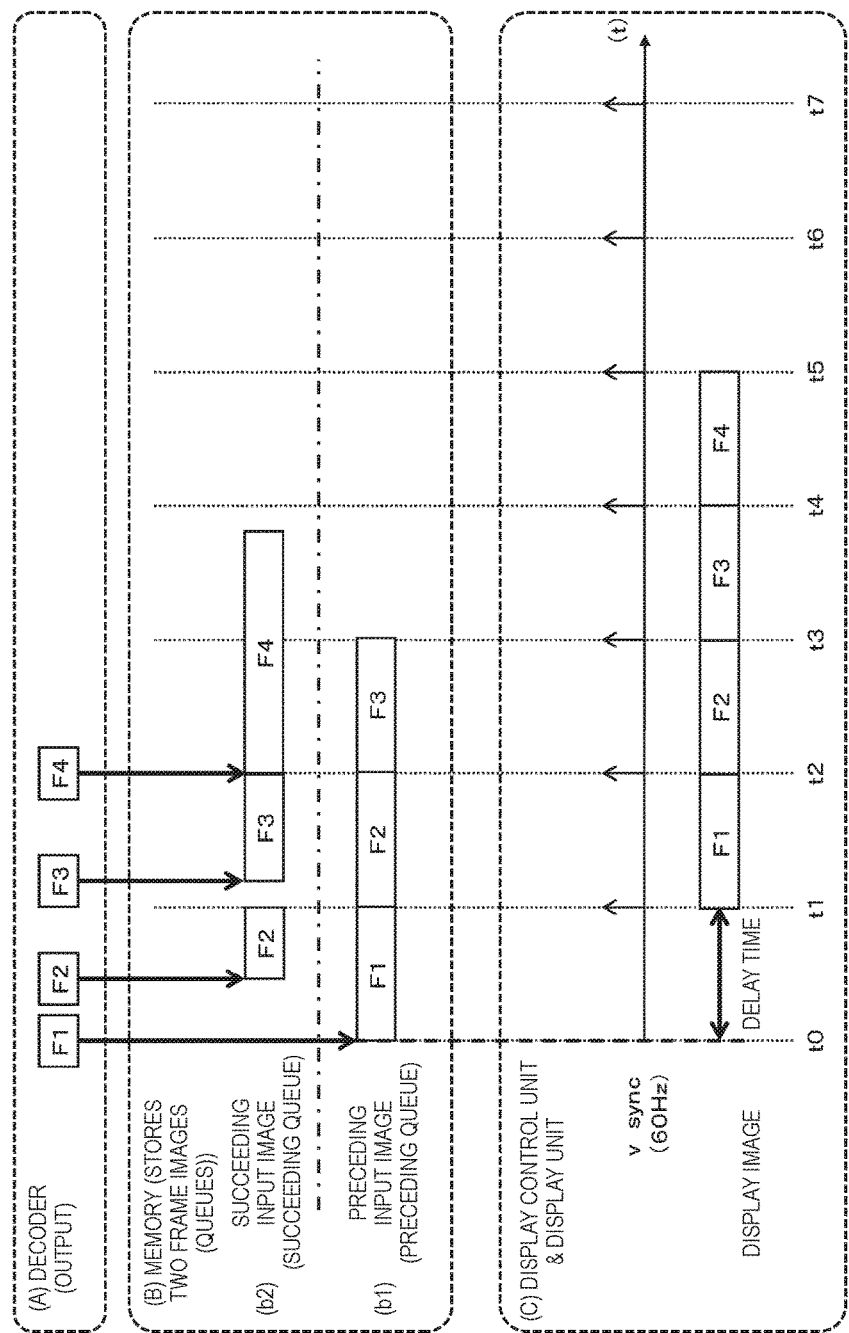
FIG. 3 is a diagram for explaining a delay in the image display of the client.

Referring to FIG. 3, a delay time from when the image frame from the decoder 52 is stored in the memory 71 until when the decoded image is displayed on the display unit 54 will be described.

FIG. 3 is a diagram illustrating a sequence associated with the transition of time from an output of data from the decoder 52 until display processing of the image frame on the display unit 54.

Each of the following data is illustrated in FIG. 3.

(A) An output of the decoder (B) Stored data in the memory (C) The image displayed on the display unit with the processing of the display control unit Time base (t) is illustrated in (C) of FIG. 3, and (A), (B), and (C) illustrates the processing performed in accordance with the time base (t).

Each of the F1, F2, F3, F4 . . . indicated in (A), (B), and (C) represents a single image frame.

F1 is an image frame F1, and F2 is an image frame F2.

Illustrated in (A) of FIG. 3 is a sequence in which the decoder 52 decodes the encoded image data input from the communication unit 51 and outputs the decoded data to the memory 71.

The intervals between the Frames F1, F2, F3, and F4 are different due to jitters (fluctuation) and the like of the network communication. A certain variation occurs in the reception intervals of the image frames and, in accordance with the reception intervals, a variation occurs in the intervals of the data output from the decoder 52.

The memory 71 in (B) of FIG. 3 has a configuration that allows two image frames to be stored. In FIG. 3, (b1) on the lower side of (B) is a preceding input image (a preceding queue) and (b2) on the upper side is a succeeding input image (a succeeding queue).

In the example illustrated in the drawing, at time t0, the frame F1 is stored in the memory as a preceding input queue and, after that, frame F2 is stored as a succeeding queue.

Note that the length of the frame Fn illustrated in (B) of FIG. 3 corresponds to the time stored in the memory.

For example, frame F1 is stored in the memory as a preceding queue between time t0 to t1.

Frame F2 is stored in the memory as a succeeding queue at an intermediate time between time t0 and t1 and is set as the succeeding queue until time t1. After that, it is illustrated that between time t1 to t2, the frame F2 is stored in the memory as a preceding queue.

In (C) of FIG. 3, a sequence related to the processing of the display control unit 72 and the display image of the display unit 54 is illustrated.

The frame F1 stored in the memory is fetched from the memory 71 by the display control unit 72 and is output to the display unit 54 between time t1 to time t2.

At time t1, when the frame F1 is fetched from the memory, the frame F2 that had been the succeeding queue is changed to the preceding queue.

Note that, strictly speaking, there is a time lag between when the image frame is fetched from the memory 71 and when the image frame is output to the display unit 54; however, the above is omitted from the illustration in FIG. 3.

Subsequently, the frame F3 that is output from the decoder is set as the succeeding queue.

At time t2, the display image of the display unit 54 is switched to frame F2.

At time t2, the frame F3 that had been the succeeding queue of the memory becomes the preceding queue and, subsequently, the frame F4 input from the decoder is stored as the succeeding queue.

In the sequence illustrated in FIG. 3 from decoding the image until displaying the image, while the output time of the image frame F1 from the decoder 52 to the memory 71 is t0, the display start time of the display unit 54 is t1, for example.

In other words, a delay from time 0 to t1 occurs from when the decoding has been completed until the display is started.

In the processing of the present disclosure, a configuration that reduces such a delay is implemented.

[3. Outline of Configuration and Processing of Information Processor of Present Disclosure]

Figure 4:
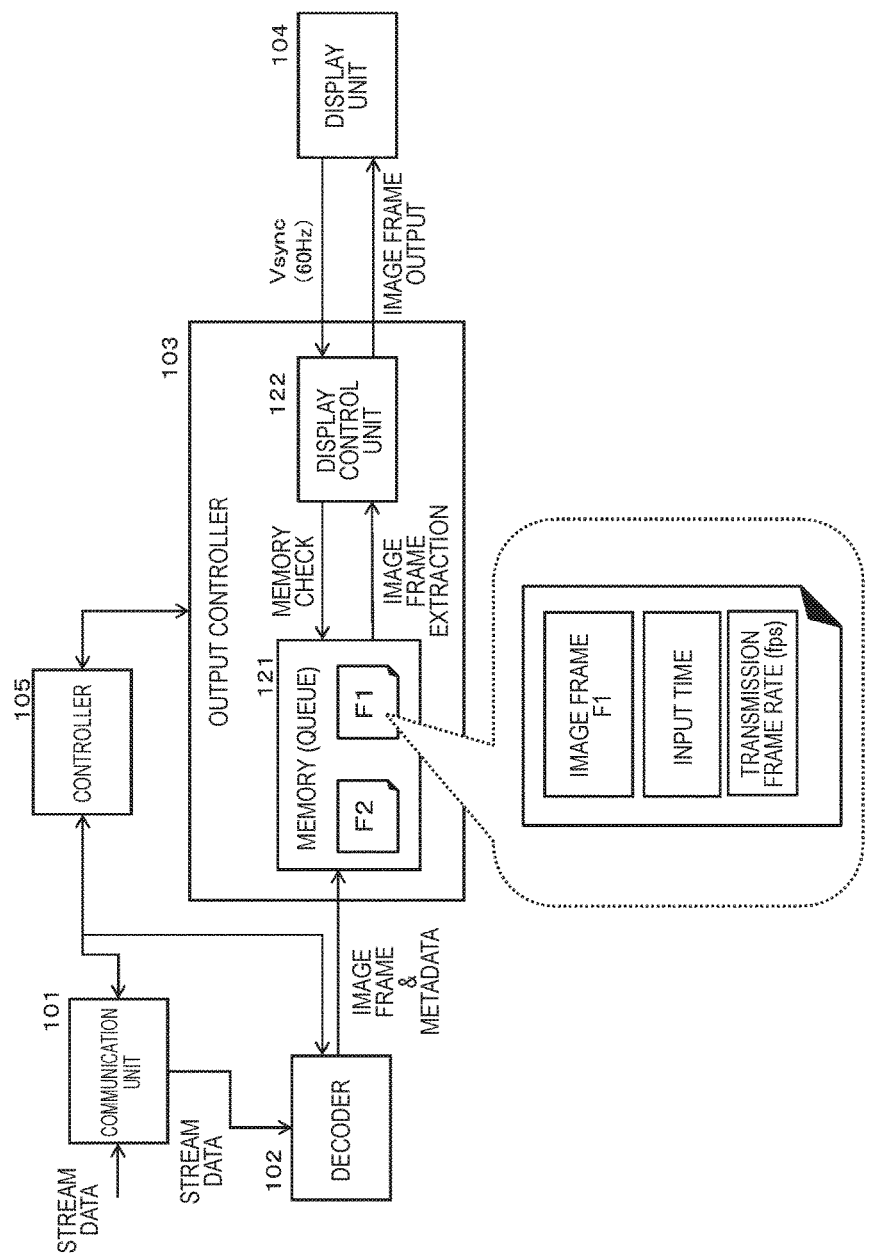
FIG. 4 is a diagram for describing an exemplary configuration of a client of the present disclosure.

FIG. 4 is a diagram illustrating an exemplary configuration of the client 20 serving as an information processor of the present disclosure. The configuration of the client 20 illustrated in FIG. 4 corresponds to a partial configuration of the client that mainly performs image processing.

A communication unit 101 receives stream data including image coded data and audio coded data transmitted by the server 30.

The received data is decoded in a decoder 102.

The decoded image data decoded in the decoder 102 is stored in a memory 121 of an output controller 103 in units of an image frame.

The memory 121 is configured so as to be capable of storing a plurality of image frames as a queue.

Herein, similar to the memory 71 described earlier with reference to FIG. 2, the memory 121 is configured so as to be capable of storing two image frames (indicated as F1 and F2 in the drawing).

A display control unit 122 sequentially acquires image frames that have been stored in the memory 121 and outputs the image frames to the display unit 104.

The display unit 104 outputs, for example, a 60 Hz vertical synchronizing signal (Vsync) to the display control unit 122, and, at a timing determined on the basis of the synchronizing signal, the display control unit 122 sequentially updates the output image frames to the display unit 104.

The display control unit 122 and the display unit 104 are connected to each other with an HDMI (registered trademark) cable.

The controller 55 performs a general control related to processing of each component.

The above basic configuration is a configuration similar to that of the conventional device described earlier with reference to FIG. 2.

The client 20 illustrated in FIG. 4 stores, in the memory 121, not only the image frames (Fn) but also the following metadata associated with the image frames in addition to the image frames.

(1) Time input to the memory (2) Transmission frame rate (fps) of the image data from the server 30

The above metadata is stored after associating the metadata with the image frames.

The server 30 appropriately changes the frame rate of the image to be transmitted in accordance with the state of the network. The information on the transmission frame rate is notified to the client from the server 30. A controller 105 fetches the information on the transmission frame rate (fps) from the notified information that has been received through the communication unit 101. The decoder 102 associates the transmission frame rate with the decoded image that is to be output and stores the resultant decoded image in the memory 121.

Furthermore, the controller 105 inputs time information from a system clock (not shown) and provides the time information to the decoder 102. The decoder 102 associates, with the decoded image, the time to input the image frame in the memory 121 as metadata=input time described above and stores the decoded image in the memory 121.

As a result, as illustrated in the drawing, in the memory 121, the following pieces of data (1) image frame (2) input time (time in which the image frame has been input in the memory)

(3) transmission frame rate (fps)

are associated and stored.

The display control unit uses the above data (1) to (3) to execute a display control of the image that is acquired from the memory 121 and that is output to the display unit 104.

Details of the processing of the above will be described later.

In the processing of the present disclosure, the time of input of the decoded image to the memory 121 is recorded as metadata associated with the relevant image frame.

The display control unit 122, for example, calculates, for each image frame, the elapsed time after being stored in the memory, and on the basis of the calculation result, performs processing of determining the output image.

Figure 5:
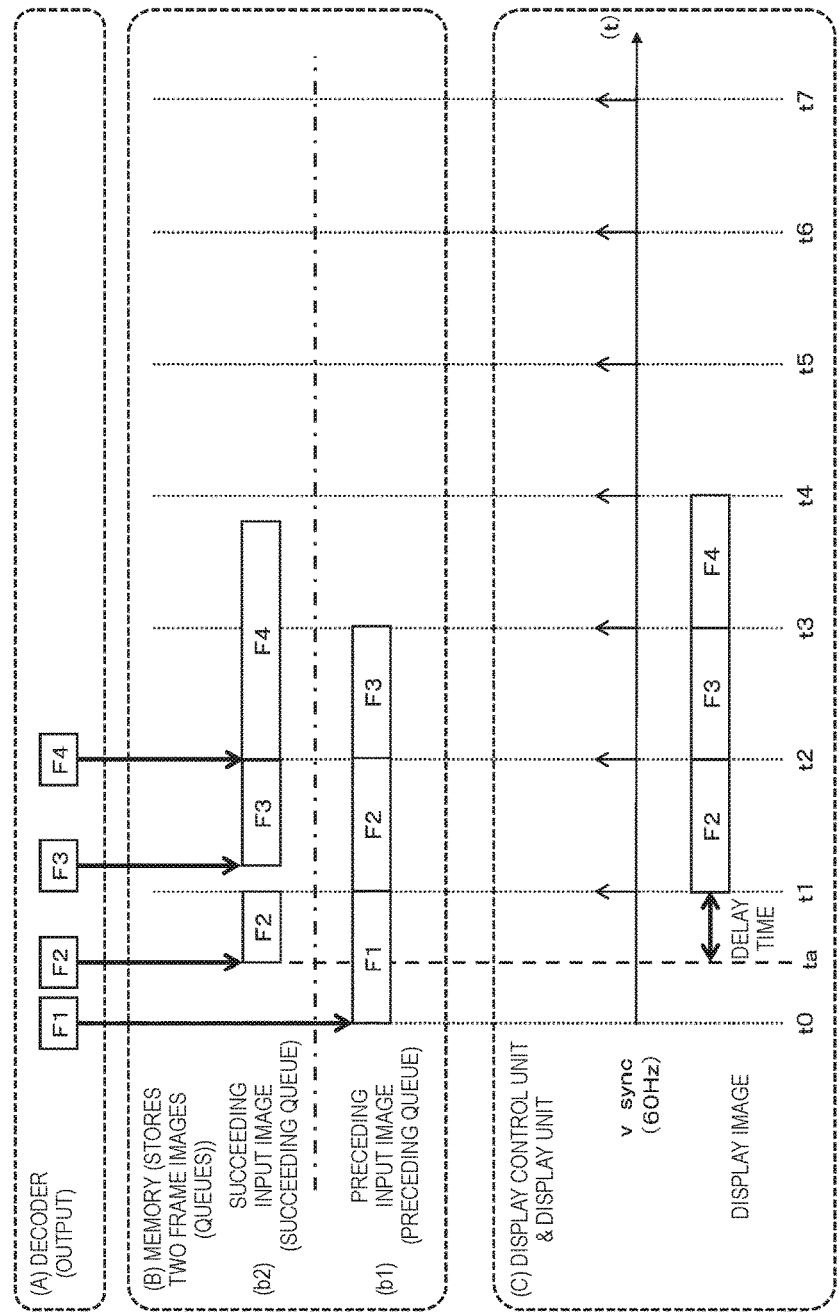
FIG. 5 is a diagram for describing an example in which the display delay in the client of the present disclosure is reduced.

FIG. 5 is a diagram illustrating an example of an image output sequence that the information processor (the client 20) of the present disclosure executes.

Similar to FIG. 3 described earlier, FIG. 5 is a diagram illustrating a sequence associated with the transition of time from an output of data from the decoder 102 until display processing of the image frame on the display unit 104.

Each of the following data is illustrated in FIG. 5.

(A) An output of the decoder (B) Stored data in the memory (C) The image displayed on the display unit with the processing of the display control unit Time base (t) is illustrated in (C) of FIG. 5, and (A), (B), and (C) illustrates the processing performed in accordance with the time base (t).

Each of the F1, F2, F3, F4 . . . indicated in (A), (B), and (C) represents a single image frame.

F1 is an image frame F1, and F2 is an image frame F2.

The memory in (B) of FIG. 5 has a configuration that allows two image frames to be stored. In FIG. 5, (b1) on the lower side of (B) is a preceding input image (a preceding queue) and (b2) on the upper side is a succeeding input image (a succeeding queue).

In the example illustrated in the drawing, at time t0, the frame F1 is stored in the memory as a preceding input queue and, after that, frame F2 is stored as a succeeding queue.

Note that similar to the description given earlier with reference to FIG. 3, the length of the frame Fn illustrated in (B) of FIG. 5 corresponds to the time stored in the memory.

For example, frame F1 is stored in the memory as a preceding queue between time t0 to t1.

Frame F2 is stored in the memory as a succeeding queue at an intermediate time between time t0 and t1 and is set as the succeeding queue until time t1. After that, it is illustrated that between time t1 to t2, the frame F2 is stored in the memory as a preceding queue.

In (C) of FIG. 5, a sequence related to the processing of the display control unit 122 and the display image of the display unit 104 is illustrated.

In the example illustrated in FIG. 5, at time t1, the display control unit 122 does not select frame F1 but selects frame F2 that are stored in the memory and outputs the frame F2 to the display unit 104.

The processing of selecting the above display image is executed as processing using the metadata associated with the image frame that is to be stored in the memory.

In the sequence illustrated in FIG. 5 from decoding the image until the image is displayed, the delay time of the image frame F2, in other words, the delay time that is from the output time of the frame F2 from the decoder 102 to the memory 121 until the display start time of the frame F2 on the display unit 104, is short compared with the delay time of the frame F1 in the sequence described with reference to FIG. 3.

As described above, in the configuration of the present disclosure, shortened delay in displaying the image is stored.

The above can be achieved by selecting the display image by using the metadata associated with the image frame that is to be stored in the memory.

The above processing will be described in detail below.

[4. Memory Storing Sequence of Decoded Image Executed by Information Processor (Client) of Present Disclosure]

Next, a memory storing sequence of a decoded image executed by the information processor (client) of the present disclosure will be described.

Figure 6:
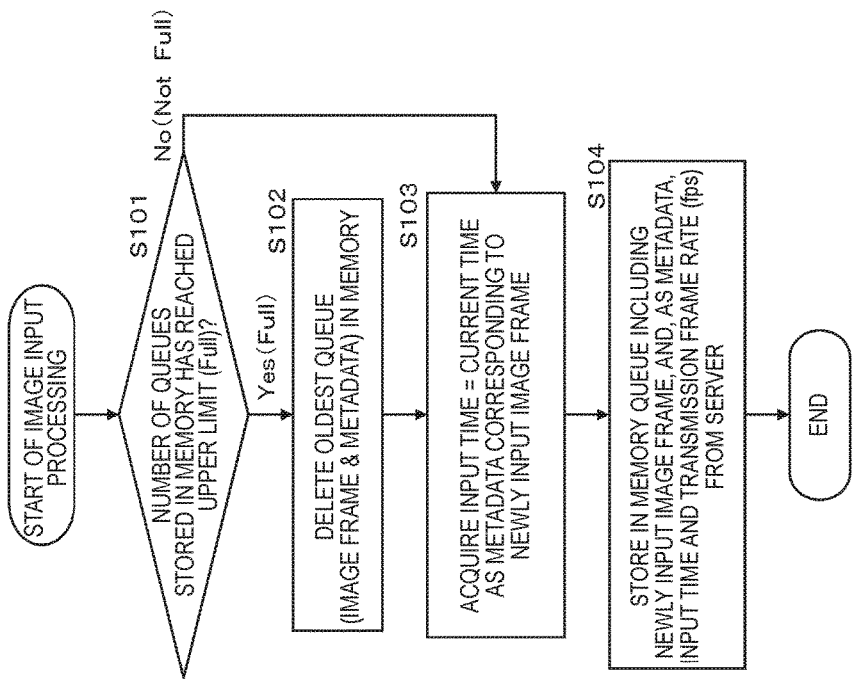
FIG. 6 is a diagram illustrating a flowchart for describing a sequence of storing image data in the memory.

FIG. 6 is a flowchart illustrating a data input processing sequence from the decoder 102 to the memory 121.

The flow illustrated in FIG. 6 is executed, for example, under control of the controller 105 and of the output controller 103 according to a program stored in a storage unit.

Note that the flow illustrated in FIG. 6 is a process that is repeatedly executed upon an input of a new data from the decoder 102.

Processing in each step will be described below.

(Step S101)

First, in step S101, determination is made whether the number of queues stored in the memory has reached the upper limit (Full).

For example, the memory 121 described with reference to FIG. 5 is configured so as to be capable of storing two queues, and when two queues are stored, it is determined that the number of queues is at the upper limit (Yes). If under one, then it is determined that the number of queues is not at the upper limit (No).

When determined to be at the upper limit (Yes), the process proceeds to step S102. On the other hand, when determined not to be at the upper limit (No), the process proceeds to step S103.

(Step S102)

When determined that the number of queues stored in the memory 121 is at the upper limit, in step S102, the oldest queue in the memory is deleted. In the case of the memory 121 illustrated in FIG. 5 that stores only two queues, the preceding queue is deleted.

Note that the queue includes, other than the image frame, metadata, such as the input time and the transmission frame rate (fps); all of the above pieces of data are deleted.

(Step S103)

After completion of deleting the queue in step S102, or when it is determined that the number of queues stored in the memory 121 is not at the upper limit in step S101, processing of step S103 is executed.

In step S103, in order to set an input time serving as metadata associated with a new image frame that has been input, the current time is acquired. The current time information is, for example, acquired from the system clock included in the client 20.

(Step S104)

Subsequently, in step S104, data including the new image frame and metadata associated with the new image frame, the metadata including the input time and the transmission frame rate (fps), are stored in the memory as a single queue.

A specific exemplary sequence of processing that stores data in the memory will be described with reference to FIG. 7.

Similar to FIG. 5 described earlier, FIG. 7 is a diagram illustrating a sequence associated with the transition of time from an output of data from the decoder 102 until display processing of the image frame on the display unit 104.

Each of the following data is illustrated in FIG. 3.

(A) An output of the decoder (B) Stored data in the memory (C) The image displayed on the display unit with the processing of the display control unit Time base (t) is illustrated in (C) of FIG. 3, and (A), (B), and (C) illustrates the processing performed in accordance with the time base (t).

Each of the F1, F2, F3, F4 . . . indicated in (A), (B), and (C) represents a single image frame.

F1 is an image frame F1, and F2 is an image frame F2.

Figure 7:
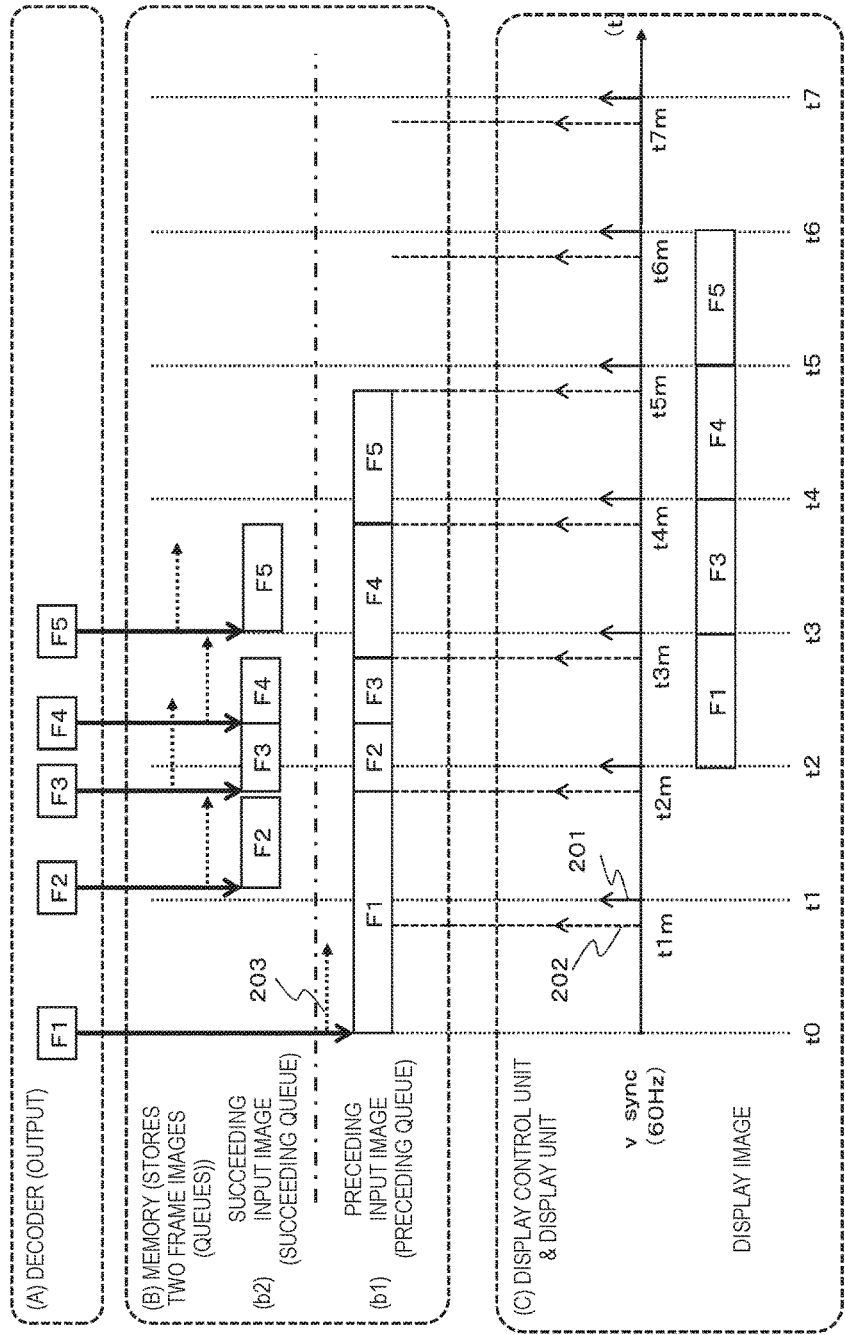
FIG. 7 is a diagram for describing a specific example of the sequence of storing image data in the memory.

Time t1, time t2, time t3 . . . depicted by solid line arrows 201 on the time base (t) illustrated in (C) of FIG. 7 are each an output timing of the vertical synchronizing signal (Vsync) of the display unit 104 and each indicate a timing in which the relevant output image frame can be switched. When the vertical synchronizing signal (Vsync) is 60 Hz, the interval between each sloid line arrow is ⅙₀ (sec).

Furthermore, t1$m$, t2$m$, t3$m$ . . . depicted by broken line arrows 202 in (C) of FIG. 7 indicate memory access timings on acquiring images from the memory 121 in order to update the output image of the display unit 104 at the output timings t1, t2, t3 . . . of the vertical synchronizing signals (Vsync) depicted by the solid line arrows 201.

In other words, for example, in order to display the image frame F1 on the display unit at time t2, the image frame F1 is acquired by accessing the memory 121 at the memory access timing of time t2$m$.

The above memory access timing corresponds to a display image update processing start timing.

The memory illustrated in (B) of FIG. 7 corresponds to the processing of the memory 121 illustrated in FIG. 4. The memory 121 has a configuration that allows two image frames to be stored. In FIG. 7, (b1) on the lower side of (B) is a preceding input image (a preceding queue) and (b2) on the upper side is a succeeding input image (a succeeding queue).

The broken line arrow 203 extending in the horizontal direction illustrated in (B) of FIG. 7 indicates a buffering time.

The buffering time is time required to store a single queue in the memory 121. In other words, it is the time from after storing the queue configuration data in the memory 121 has been started at the above-described input time until all of the pieces of queue configuration data are stored completely in the memory 121 such that, subsequently, the queue can be fetched in a stable manner.

The buffering time is stored in advance in a nonvolatile memory as data unique to the device (the client).

Alternatively, the buffering time may be time information that can be set by the user.

The processing of the decoder 102 of storing the output image in the memory 121 is executed according to the flow illustrated in FIG. 6.

For example, when the frame F1 is input in the memory 121 from the decoder 102, the storage queue of the memory is zero and the determination in step S101 is No such that processing from step S103 to S104 is executed.

As a result, a queue including the image frame F1, the time of input of the image frame F1, and the transmission frame rate (fps) is stored in the memory 121.

The same applies when inputting frame F2 in the memory 121 from the decoder 102.

Furthermore, at the time when the frame F3 is input in the memory 121 from the decoder 102, the image frame F1 that is the preceding queue of the memory 121 is acquired by the display control unit. Accordingly, when the frame F3 is input in the memory 121, the determination in step S101 is No such that processing from step S103 to S104 is executed.

However, for example, in the example illustrated in FIG. 7, when inputting the frame F4 in the memory 121 from the decoder 102, the image frames F2 and F3 are stored in the memory 121. In other words, since it is the upper limit (the number of queues=2) of the number of queues, the determination in step S101 is Yes.

In the above case, in step S102, deletion of the oldest queue is executed. At the point when frame F4 is input, the oldest queue stored in the memory 121 is the image frame F2, and the image frame F2 and the metadata thereof are deleted.

In addition to the deletion processing, the succeeding queue F3 is changed to the preceding queue and frame F4 is stored as the succeeding queue.

As described above, at the point when a new input image is generated, when the number of queues in the memory 121 is the upper limit number, the processing of deleting the old queue and storing a new input image is executed.

[5. Detailed Sequence of Image Display Control Processing Executed by Information Processor (Client) of Present Disclosure]

A display control sequence of an image frame stored in the memory 121 will be described next.

The output controller 103 of the information processor (the client 20) of the present disclosure performs different processing depending on the two following states when acquiring an image stored in the memory 121 and outputting the image to the display unit 104.

(State 1)=display update stopped state (uninitialized)
(State 2)=display update executing state (initialized)

(State 1)=display update stopped state (uninitialized) is a state in which the image for display update cannot be acquired from the memory 121, and (State 2)=display update executing state (initialized) is a state in which the image for display update can be acquired from the memory 121.

Processing in each of the above states will be described in order with reference to the drawings as described below.

The processing in the case of (State 1)=display update stopped state (uninitialized) will be described with reference to the flowchart illustrated in FIG. 8 and the specific examples illustrated in FIGS. 9 and 10.

The processing in the case of (State 2)=display update executing state (initialized) will be described with reference to the flowchart illustrated in FIG. 11 and the specific examples illustrated in FIG. 12 and after.

[5-1. Processing in Display Update Stopped State (Uninitialized)]

The processing in the case of (State 1)=display update stopped state (uninitialized) will be described first with reference to the flowchart illustrated in FIG. 8.

Figure 8:
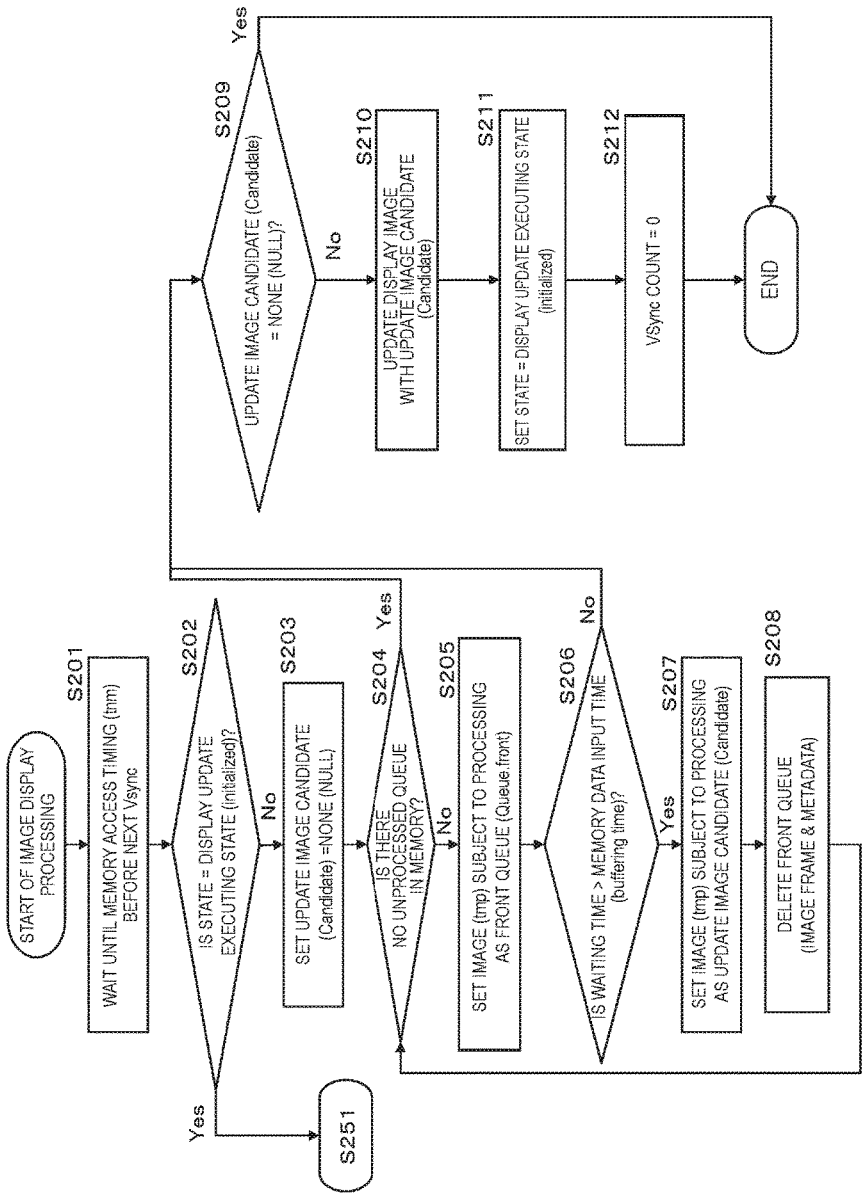
FIG. 8 is a diagram illustrating a flowchart for describing an image display control sequence in a display update stopped state (uninitialized).

FIG. 8 is a flowchart illustrating a processing sequence of selectively acquiring a queue stored in the memory 121, in other words, a queue that includes an image frame, and an input time and a transmission frame rate (fps) serving as metadata, and displaying the queue on the display unit 104.

The flow illustrated in FIG. 8 is executed, for example, under control of the controller 105 and of the output controller 103 according to a program stored in a storage unit.

Note that the flow illustrated in FIG. 8 is a process that is repeatedly executed in accordance with the period of the vertical synchronizing signal (Vsync) of the display unit 104.

Processing in each step will be described below.

(Step S201)

First, in step S201, the display control unit 122 of the output controller 103 waits until a memory access timing (tnm) before the next Vsync.

The memory access timing (tnm) is a memory access timing corresponding to $t1m, t2m$ . . . described earlier with reference to FIG. 7.

(Step S202)

When the memory access timing (tnm) has come, in step S202, the display control unit 122 determines whether the present state is the display update executing state (initialized).

As described above, the output controller 103 of the information processor (the client 20) of the present disclosure performs different processing depending on the two following states when acquiring an image stored in the memory 121 and outputting the image to the display unit 104.

(State 1)=display update stopped state (uninitialized)
(State 2)=display update executing state (initialized)

(State 1)=display update stopped state (uninitialized) is a state in which the image for display update cannot be acquired from the memory 121, and (State 2)=display update executing state (initialized) is a state in which the image for display update can be acquired from the memory 121.

If the present state is the display update executing state (initialized), the process proceeds to step S251. The processing in the above case will be described later with reference to FIG. 11 and after.

Meanwhile, when the present state is not the display update executing state (initialized) but is the display update stopped state (uninitialized), the process proceeds to step S203. In this flow, the processing in this case will be described.

In other words, it is processing when in a state in which the image for display update cannot be acquired from the memory 121.

(Step S203)

In step S203, an update image candidate (Candidate) is set to "none (NULL)".

The update image candidate (Candidate) is a candidate for the image that is to be displayed next on the display unit 104.

(Step S204)

Subsequently, the display control unit 122 determines whether there is any unprocessed queue that is subject to processing in the memory 121.

When there is no update image candidate, the process proceeds to step S209.

When there is an update image candidate, the process proceeds to step S205.

(Step S205)

When it is verified that there is an unprocessed queue that is subject to processing in the memory, in step S205, the display control unit 122 sets the image (tmp) subject to processing as a front queue (Quee.front).

(Step S206)

Subsequently, determination is made whether condition
waiting time>buffering time
is satisfied by the image (tmp) subject to processing.

The waiting time is the elapsed time after the queue has been set in the memory 121.

The above can be calculated as the elapsed time from the input time that is metadata of the image frame set in the queue.

As described with reference to FIG. 7, the buffering time is time required to store a single queue in the memory 121. In other words, it is the time from after storing the queue configuration data in the memory 121 has been started at the above-described input time until all of the pieces of queue configuration data are stored completely in the memory 121 such that, subsequently, the queue can be fetched in a stable manner.

The buffering time is stored in advance in a nonvolatile memory as data unique to the device (the client). Alternatively, the buffering time may be time set by the user.

In step S206, determination is made whether
waiting time>buffering time
is satisfied by the image (tmp) subject to processing.

When the determination condition in step S206, that is
waiting time>buffering time
is satisfied (Yes), the process proceeds to step S207. When not satisfied (No), the process proceeds to step S209.

(Step S207)

When waiting time>buffering time is satisfied, the process proceeds to step S207, and the image (tmp) subject to processing is set as the update image candidate (Candidate).

The above update image candidate (Candidate) is acquired from the memory.

(Step S208)

In step S208, the front queue that has already been acquired as the update image candidate (Candidate) is deleted.

If there is a succeeding queue, the succeeding queue is set as the front queue.

Subsequently, the process returns to step S204 and repeats the processing from step S204 and after.

From the front queue to the succeeding queue in the memory, processing subjects (tmps) are sequentially set and the processing of steps S204 to S208 is executed.

In other words, during the repetitive process of the processing of steps S204 to S208, when the determination processing of step S206, in other words, when there is a processing subject queue that does not satisfy
waiting time>buffering time
is detected, the process proceeds to step S209.

Note that at the point of proceeding to step S209, when there is not a single queue in the memory 121 that satisfy
waiting time>buffering time,
the update image candidate (Candidate) is not set.

On the other hand, when there are one or more queues that satisfy
waiting time>buffering time,
among the one or more queues, the newest input image with respect to the memory 121, in other words, a single queue that is the newest is selected and the image of the newest queue is set as the update candidate image (Candidate).

(Step S209)

Step S209 is executed when it is determined in step S204 that there is no unprocessed queue in the memory or that, in step S206, a queue that does not satisfy
waiting time>buffering time
is detected.

In step S209, determination is made whether the update image candidate (Candidate) is "none (NULL)".

In the processing of steps S204 to S208, when there are one or more queues that satisfy
waiting time>buffering time,
among the one or more queues, the newest input image with respect to the memory 121, in other words, a single queue that is the newest is selected and the image of the newest queue is set as the update candidate image (Candidate).

Other than the cases described above, in other words, when there is not a single queue in the memory 121, or when there is not a single queue that satisfies
waiting time>buffering time,
in such cases,
the update image candidate (Candidate) is "none (NULL)" and the determination in step S209 is (No), and the process is ended.

On the other hand, in the processing of steps S204 to S206, when there are one or more queues that satisfy
waiting time>buffering time,
among the one or more queues, the newest input image with respect to the memory 121, in other words, a single queue that is the newest is selected and the image of the newest queue is set as the update candidate image (Candidate).

In the above case, the process proceeds to step S210.

(Step S210)

Subsequently, in step S210, the display control unit 122 outputs the update image candidate (Candidate) to the display unit 104 and executes the image update.

(Step S211)

Subsequently, the controller 105 sets the state to display update executing state (initialized).

(Step S212)

Subsequently, upon output of the update image (Candidate) to the display unit 104, the vertical synchronizing signal (Vsync) is set to zero.

The flowchart illustrated in FIG. 8 is a processing sequence in the case in which (State 1)=display update stopped state (uninitialized), and when the update of the display image is resumed in step S210, in step S211, a change in state that changes to (State 2)=display update executing state (uninitialized) is executed.

A specific example of the process according to the flow illustrated in FIG. 8 will be described with reference to FIGS. 9 and 10.

Similar to FIGS. 5 and 7 described earlier, FIG. 9 is a diagram illustrating a sequence associated with the transition of time from an output of data from the decoder 102 until display processing of the image frame on the display unit 104.

Figure 9:
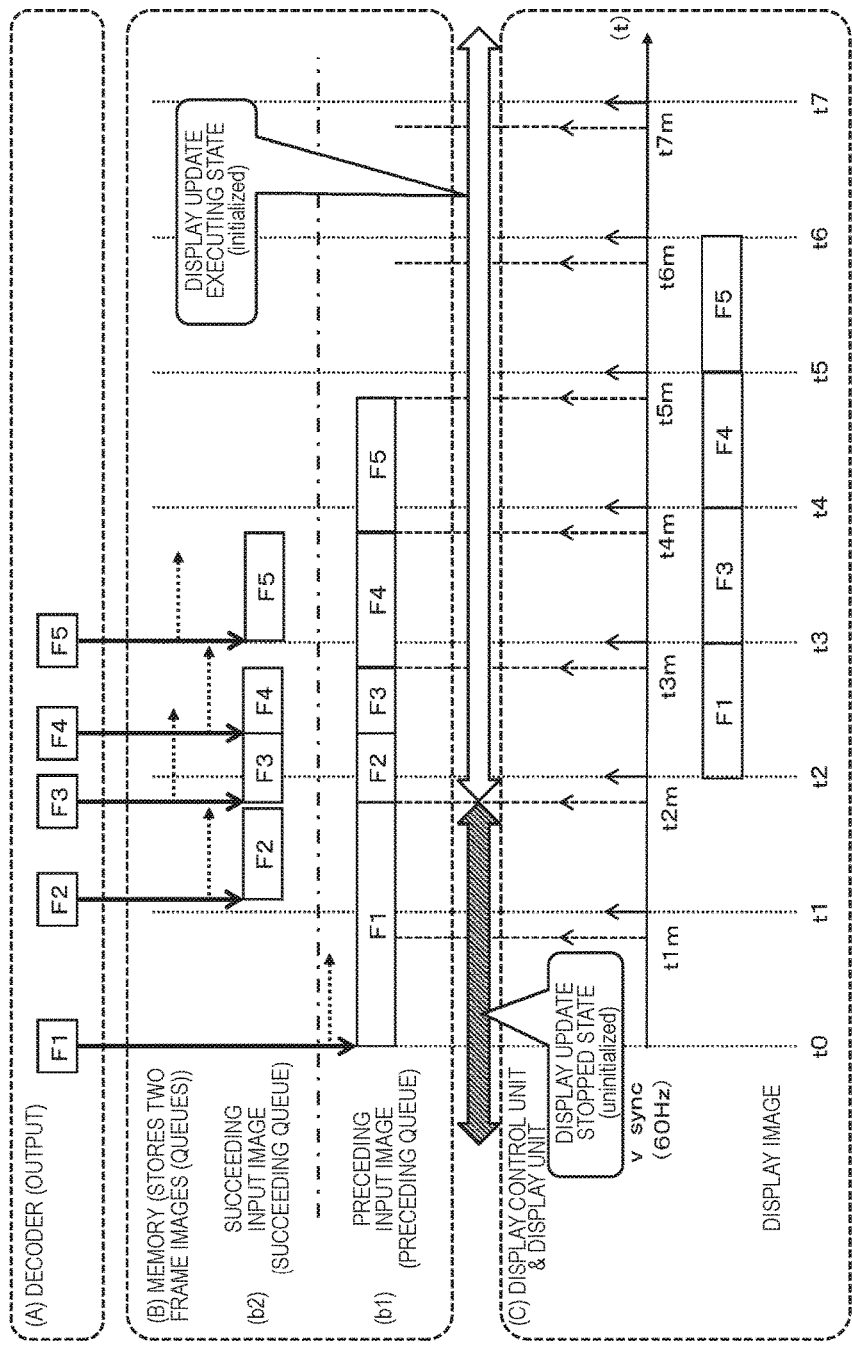
FIG. 9 is a diagram for describing a specific example of the image display control sequence in the display update stopped state (uninitialized).

Each of the following data is illustrated in FIG. 9.

(A) An output of the decoder (B) Stored data in the memory (C) The image displayed on the display unit with the processing of the display control unit Time base (t) is illustrated in (C) of FIG. 9, and (A), (B), and (C) illustrates the processing performed in accordance with the time base (t).

Each of the F1, F2, F3, F4 . . . indicated in (A), (B), and (C) represents a single image frame.

F1 is an image frame F1, and F2 is an image frame F2.

Time t1, time t2, time t3 . . . depicted by solid line arrows on the time base (t) illustrated in (C) of FIG. 9 are each an output timing of the vertical synchronizing signal (Vsync) of the display unit 104 and each indicate a timing in which the relevant output image frame can be switched. When the vertical synchronizing signal (Vsync) is 60 Hz, the interval between each solid line arrow is ⅟₆₀ (sec).

Furthermore, time t1m, time t2m, time t3m . . . indicated by broken line arrows represents memory access timings to acquire images from the memory 121.

The memory 121 illustrated in (B) of FIG. 9 is the memory 121 illustrated in FIG. 4 and has a configuration that allows two image frames to be stored. In FIG. 9, (b1) on the lower side of (B) is a preceding input image (a preceding queue) and (b2) on the upper side is a succeeding input image (a succeeding queue).

In FIG. 9, State 1=display update stopped state (uninitialized) is during the period of t0 to t2m on the time base (t), and after t2m, is changed to State 2=display update executing state (initialized).

The above change in state is executed in the state change processing of step S211 in the flowchart illustrated in FIG. 8.

The image frame F1 displayed on the display unit 104 during the change in state is the image frame that is selected according to the flow illustrated in FIG. 8.

In other words, the image frame F1 is the update image candidate (Candidate) that is applied to the update processing of the display image in step S210 of the flow illustrated in FIG. 8.

The determination processing of the update image candidate (Candidate) is executed by the processing of steps S204 to S208 in the flow illustrated in FIG. 8.

As described above, the processing of steps S204 to S208 is repeatedly executed while the front queue to the succeeding queue in the memory are sequentially set as the processing subject (tmp).

In the processing of steps S204 to S208, when there are one or more queues that satisfy
waiting time>buffering time,
among the one or more queues, the newest input image with respect to the memory 121, in other words, a single queue that is the newest is selected and the image of the newest queue is set as the update candidate image (Candidate).

In the example illustrated in FIG. 9, the processing from step S201 and after in FIG. 8 is executed at time t2m.

At time t2m, the image frame F1 is stored as the preceding queue and the image frame F2 is stored as the succeeding queue in the memory 121.

Accordingly, in the processing of steps S204 to S208, the two queues, in other words, the image frames F1 and F2, are executed.

First, the determination processing of step S206 is executed on the image frame F1 that is the preceding queue.

The display control unit 122 acquires the input time that is metadata associated with the image frame F1 and determines whether the criterion
waiting time>buffering time
is satisfied.

Since the above image frame F1 satisfies the criterion described above, the determination in step S206 is Yes and the process proceeds to step S207.

In step S207, the image frame F1 is set as the update image candidate (Candidate).

Subsequently, the processing subject (tmp) is switched to the succeeding queue and the determination processing of step S206 is executed on the image frame F2 that is the succeeding queue.

The display control unit 122 acquires the input time that is metadata associated with the image frame F2 and determines whether the criterion
waiting time>buffering time
is satisfied.

The above image frame F2 is determined that it does not satisfy the criterion described above, that is, the determination in step S206 is No, and the process proceeds to step S209.

As a result, the display control unit 122 outputs the image frame F1 that is set as the update image candidate (Candidate) at this point to the display unit 104, and executes the image update.

The above processing is the processing of step S210.

Subsequently, in step S211, the state is changed to State 2=display update executing state (initialized).

Figure 10:
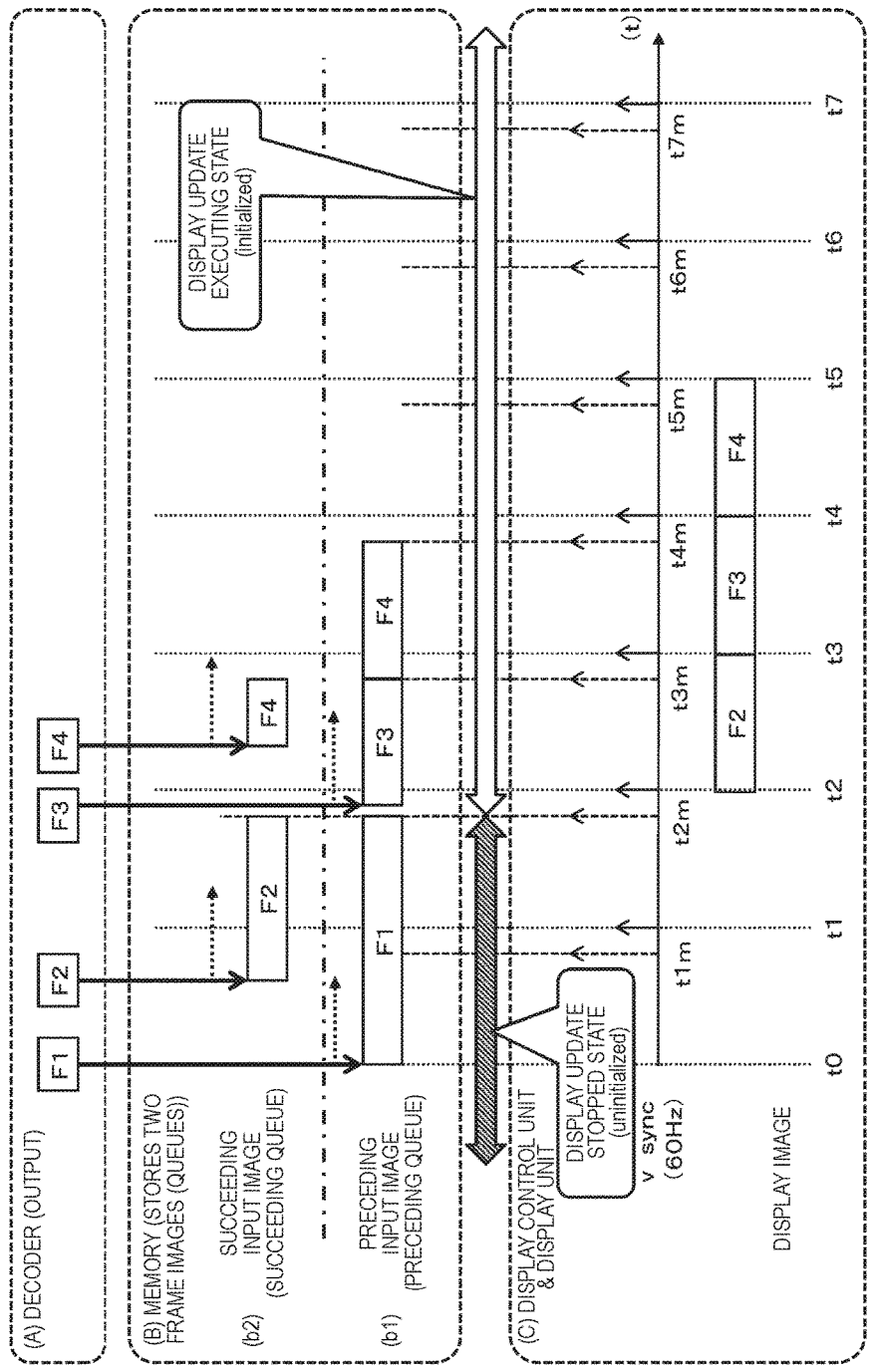
FIG. 10 is a diagram for describing a specific example of the image display control sequence in the display update stopped state (uninitialized).

The example illustrated in FIG. 10 is also a process according to the flow illustrated in FIG. 8, in other words, is a diagram illustrating a specific example of the processing in State 1=display update stopped state (uninitialized).

In the example illustrated in FIG. 10, the processing from step S201 and after in FIG. 8 is executed at time t2m.

At time t2m, the image frame F1 is stored as the preceding queue and the image frame F2 is stored as the succeeding queue in the memory 121.

Accordingly, in the processing of steps S204 to S208, the two queues, in other words, the image frames F1 and F2, are executed.

First, the determination processing of step S206 is executed on the image frame F1 that is the preceding queue.

The display control unit 122 acquires the input time that is metadata associated with the image frame F1 and determines whether the criterion
waiting time>buffering time
is satisfied.

Since the above image frame F1 satisfies the criterion described above, the determination in step S206 is Yes and the process proceeds to step S207.

In step S207, the image frame F1 is set as the update image candidate (Candidate).

Subsequently, the processing subject (tmp) is switched to the succeeding queue and the determination processing of step S206 is executed on the image frame F2 that is the succeeding queue.

The display control unit 122 acquires the input time that is metadata associated with the image frame F2 and determines whether the criterion
waiting time>buffering time
is satisfied.

The above image frame F2 is determined that it satisfies the criterion described above, that is, the determination in step S206 is Yes, and the process proceeds to step S207.

In step S207, the image frame F2 is set as the update image candidate (Candidate).

Subsequently, in step S208, the front queue is deleted. In other words, the image frame F1 is deleted.

Subsequently, the process proceeds to step S204.

In step S204, determination is made whether there is an unprocessed queue in the memory. Since processing of two queues has already been completed, it is determined that there is no unprocessed queue and the process proceeds to step S209.

As a result, the display control unit 122 outputs the image frame F2 that is set as the update image candidate (Candidate) at this point to the display unit 104, and executes the image update.

The above processing is the processing of step S210.

Subsequently, in step S211, the state is changed to State 2=display update executing state (initialized).

As described above, the example illustrated in FIG. 10 is an example of processing in a case in which two queues, that is, both the image frame F1 and the image frame F2, stored in the memory 121, at the point of memory access timing t2m, satisfy the criterion waiting time>buffering time.

As described above, in a case in which a plurality of queues satisfy waiting time>buffering time, the update processing is performed by setting the image corresponding to the newest input queue as the update candidate image (Candidate).

By executing such processing, an image update with less delay is performed.

Note that in the image update processing, the display of the image frame F1 on the display unit is not performed; however, omission of display of a single frame is almost not recognized by the viewer and does not generate any discomfort.

[5-2. Processing in Display Update Executing State (Initialized)]

In FIGS. 8 to 10, the image display control processing in a case in which (State 1)=display update stopped state (uninitialized) has been described.

Subsequently, image display control processing in a case in which (State 2)=display update executing state (initialized) will be described with reference to FIG. 11 and after.

Figure 11:
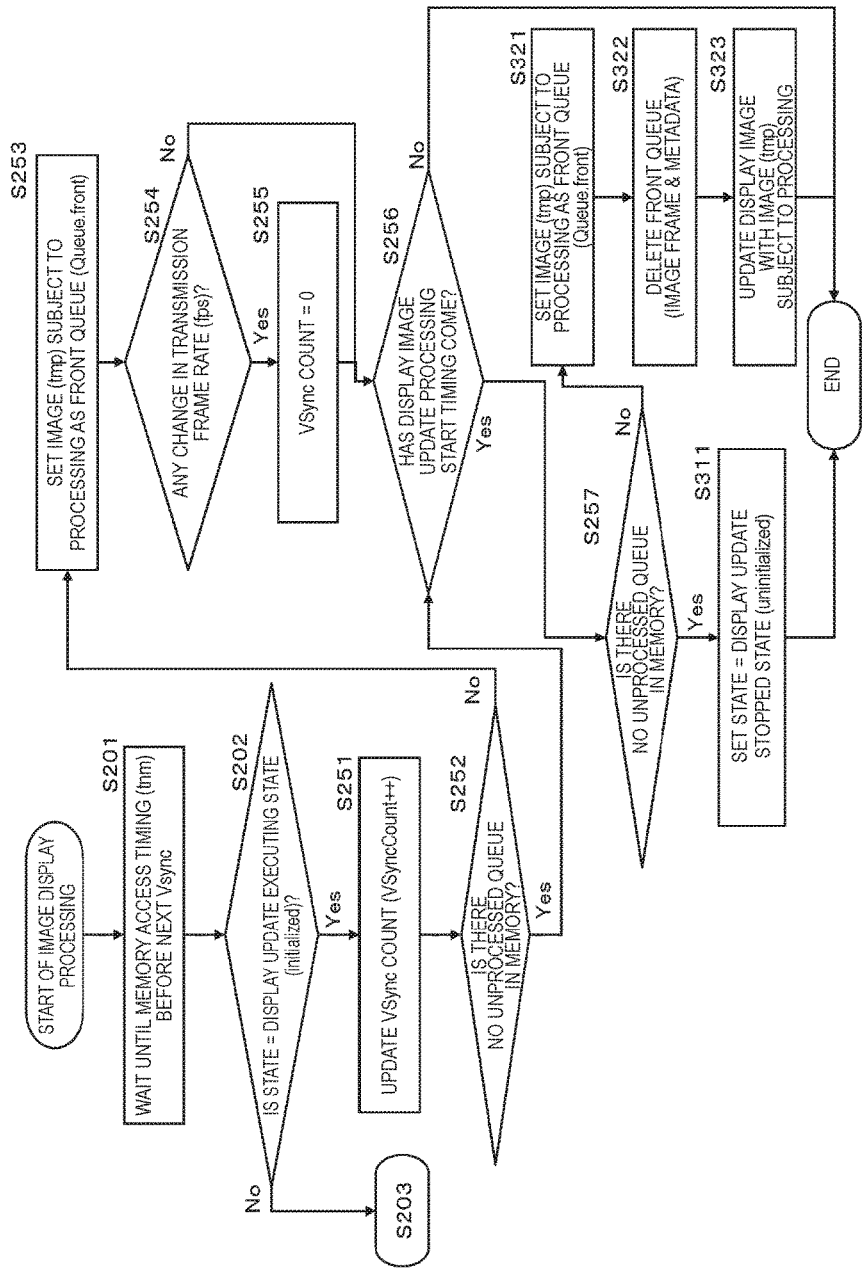
FIG. 11 is a diagram illustrating a flowchart for describing an image display control sequence in a display update executing state (initialized).

Like FIG. 8, FIG. 11 is a flowchart illustrating a processing sequence of selectively acquiring a queue stored in the memory 121, in other words, a queue that includes an image frame, and an input time and a transmission frame rate (fps) serving as metadata, and displaying the queue on the display unit 104.

The flow illustrated in FIG. 11 is executed, for example, under control of the controller 105 and of the output controller 103 according to a program stored in a storage unit.

Note that, like the flow illustrated in FIG. 8, the flow illustrated in FIG. 11 is a process that is repeatedly executed in accordance with the period of the vertical synchronizing signal (Vsync) of the display unit 104.

Processing in each step will be described below.

(Step S201)

The processing of step S201 to S202 is processing similar to the processing of step S201 to S202 in the flow of FIG. 8 described earlier.

First, in step S201, the display control unit 122 of the output controller 103 waits until a memory access timing (tnm) before the next Vsync.

The memory access timing (tnm) is a memory access timing corresponding to t1m, t2m . . . described earlier with reference to FIG. 7.

(Step S202)

When the memory access timing (tnm) has come, in step S202, the display control unit 122 determines whether the present state is the display update executing state (initialized).

As described above, the output controller 103 of the information processor (the client 20) of the present disclosure performs different processing depending on the two following states when acquiring an image stored in the memory 121 and outputting the image to the display unit 104.

(State 1)=display update stopped state (uninitialized)
(State 2)=display update executing state (initialized)

(State 1)=display update stopped state (uninitialized) is a state in which the image for display update cannot be acquired from the memory 121, and (State 2)=display update executing state (initialized) is a state in which the image for display update can be acquired from the memory 121.

When the present state is not the display update executing state (initialized) but is the display update stopped state (uninitialized), the process proceeds to step S203. The processing from step S203 and after is processing that is executed in accordance with the flow illustrated in FIG. 8 described earlier.

Meanwhile, if the present state is the display update executing state (initialized), the process proceeds to step S251. The processing in the above case will be described below.

(Step S251)

In step S251, the vertical synchronizing signal (Vsync) that specifies the image update timing of the display 104 is counted.

(Step S252)

Subsequently, the display control unit 122 determines whether there is any unprocessed queue that is subject to processing in the memory 121.

When there is no update image candidate, the process proceeds to step S256.

When there is an update image candidate, the process proceeds to step S205.

(Step S253)

When it is verified that there is an unprocessed queue that is subject to processing in the memory, in step S253, the display control unit 122 sets the image (tmp) subject to processing as a front queue (Quee.front).

(Step S254)

Subsequently, the display control unit 122 acquires a transmission image frame rate (fps) set as metadata associated with an image frame Fx of a front queue that is an image (tmp) subject to processing. The transmission frame rate information is information that is received by the client 20 as notification information from the server 30.

The display control unit 122 retains the frame rate information (fps) associated with the recent display image in the memory, and determines whether the transmission frame rate is to be changed or not by making a comparison with the recent transmission frame rate (fps).

Note that as described above, the server 30 appropriately changes the transmission frame rate in accordance with the congestion situation and the congested state of the network. For example, two rates of 60 fps and 30 fps are used while appropriately switching the two rates.

In step S254, when the change in the server transmission frame rate (fps) is detected, the process proceeds to step S255. On the other hand, when the change in the server transmission frame rate (fps) is not detected, the process proceeds to step S256.

(Step S255)

In step S254, when the change in the server transmission frame rate (fps) is detected, the process proceeds to step S255, and, the count of the vertical synchronizing signal of the display unit 1104 is set to zero and the process proceeds to step S256.

(Step S256)

Step S256 is processing executed in either of the following cases.

Step S256 is executed when in step S252, it is determined that there is no unprocessed queue in the memory 121, when in step S254, the change in the server transmission frame rate (fps) is detected and the process proceeding to step S255 sets the vertical synchronizing signal to zero, when in step S254, the change in the server transmission frame rate (fps) is not detected.

In step S256, determination is made whether the update processing start timing of the display image has come. Note that the image update processing start timing is set different according to the transmission frame rate (fps), for example.

Specifically, when the image transmission frame rate from the server 30 is 60 fps, the update is executed each 1/60 (sec), and when the image transmission frame rate from the server 30 is 30 fps, the update is executed each 1/30 (sec).

In step S256, when it is determined that the update processing start timing of the display image has come, the process proceeds to step S257.

In step S256, when it is determined that the update processing start timing of the display image has not come, the process is ended.

(Step S257)

In step S256, when it is determined that the update processing start timing of the display image has come, the process proceeds to step S257 and determination is made whether there is an unprocessed queue in the memory 121.

When there is no unprocessed queue, the process proceeds to step S311.

When there is an unprocessed queue, the process proceeds to step S321.

(Step S311)

At the timing when, in step S256, it is determined that the update processing start timing of the display image has come, and when, in step S257, it is determined that there is no unprocessed queue in the memory 121, image update on the display unit 104 cannot be performed.

In such a case, the change in state is performed in step S311.

In other words, the state is set to State 1=display update stopped state (uninitialized) and the process is ended.

(Step S321)

On the other hand, when, in step S256, it is determined that the update processing start timing of the display image has come, and when, in step S257, it is determined that there is no unprocessed queue in the memory 121, the process proceeds to step S321.

In step S321, the display control unit 122 sets the front queue (Queue.front) of the memory 121 to image (tmp) subject to processing and acquires the front queue from the memory 121.

(Step S322)

In step S322, the front queue that has already been acquired as the image (tmp) subject to processing is deleted. If there is a succeeding queue, the succeeding queue is set as the front queue.

(Step S323)

Subsequently, in step S323, the display control unit 122 outputs, to the display unit 104, the image (tmp) subject to processing that is the front queue that has already been acquired from the memory 121 and executes the image update.

Note that as it can be understood from the description of the flow illustrated in FIGS. 8 and 11, on the basis of the acquisition state of the data for display from the memory 121, the display control unit 122 executes the processing of switching the state of the device from the display update executing state (initialized) to the display update stopped state (uninitialized) or from the display update stopped state (uninitialized) to the display update executing state (initialized).

When the state of the device is in the display update stopped state (uninitialized), the waiting time, which is the elapsed time from time of input to the memory, and the buffering time, which is specified as the required time to store data in the memory, are compared and the image frame in which the waiting time exceeds the buffering time is selected as the output image to the display unit.

On the other hand, when the state of the device is in the display update executing state (initialized), regardless of whether or not the waiting time exceeds the buffering time, the image frame that can be acquired from the memory is selected as the output image to the display unit.

A specific example of the process according to the flow illustrated in FIG. 11 will be described with reference to FIG. 12 and after.

Figure 12:
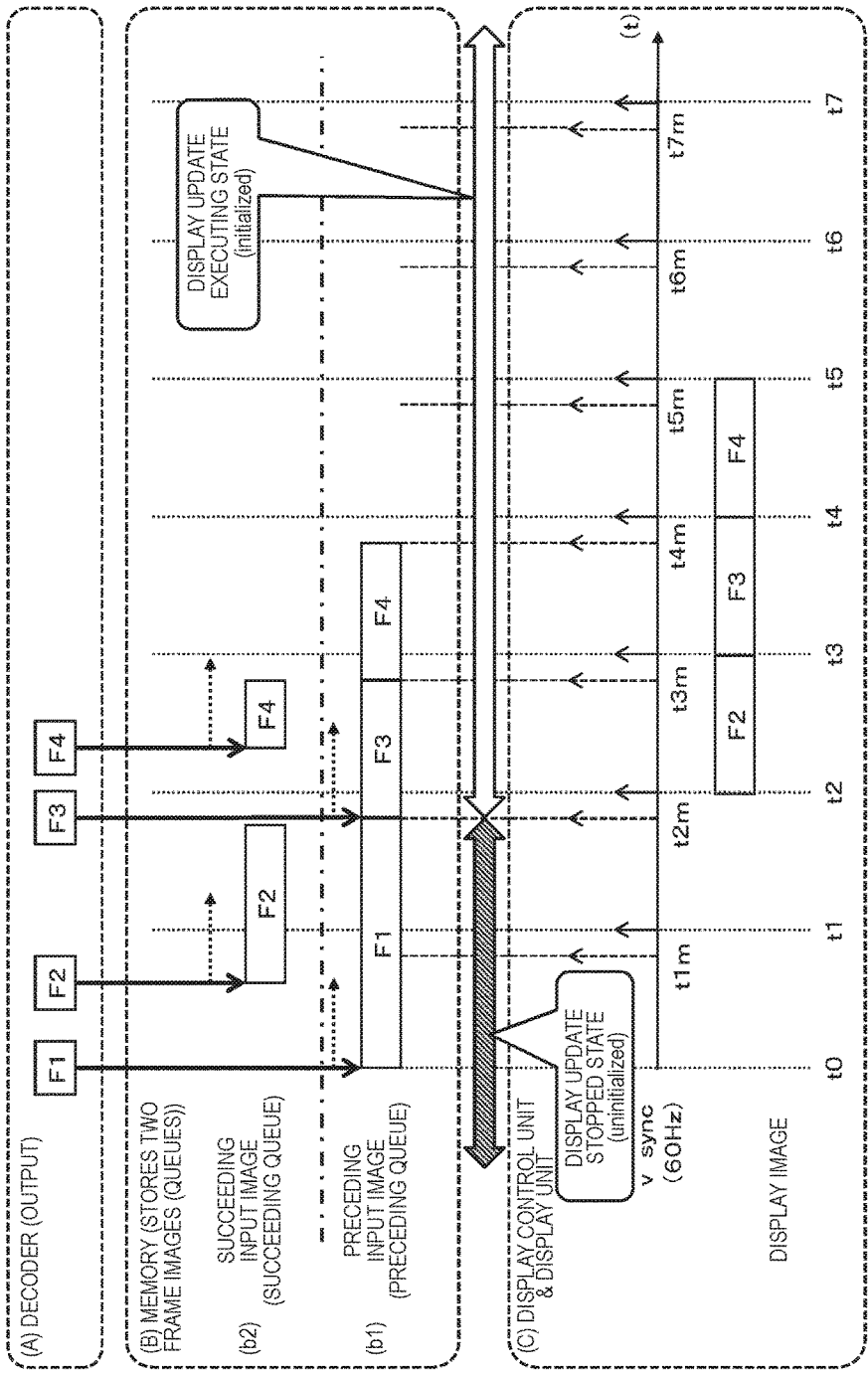
FIG. 12 is a diagram for describing a specific example of the image display control sequence in the display update executing state (initialized).
Figure 13:
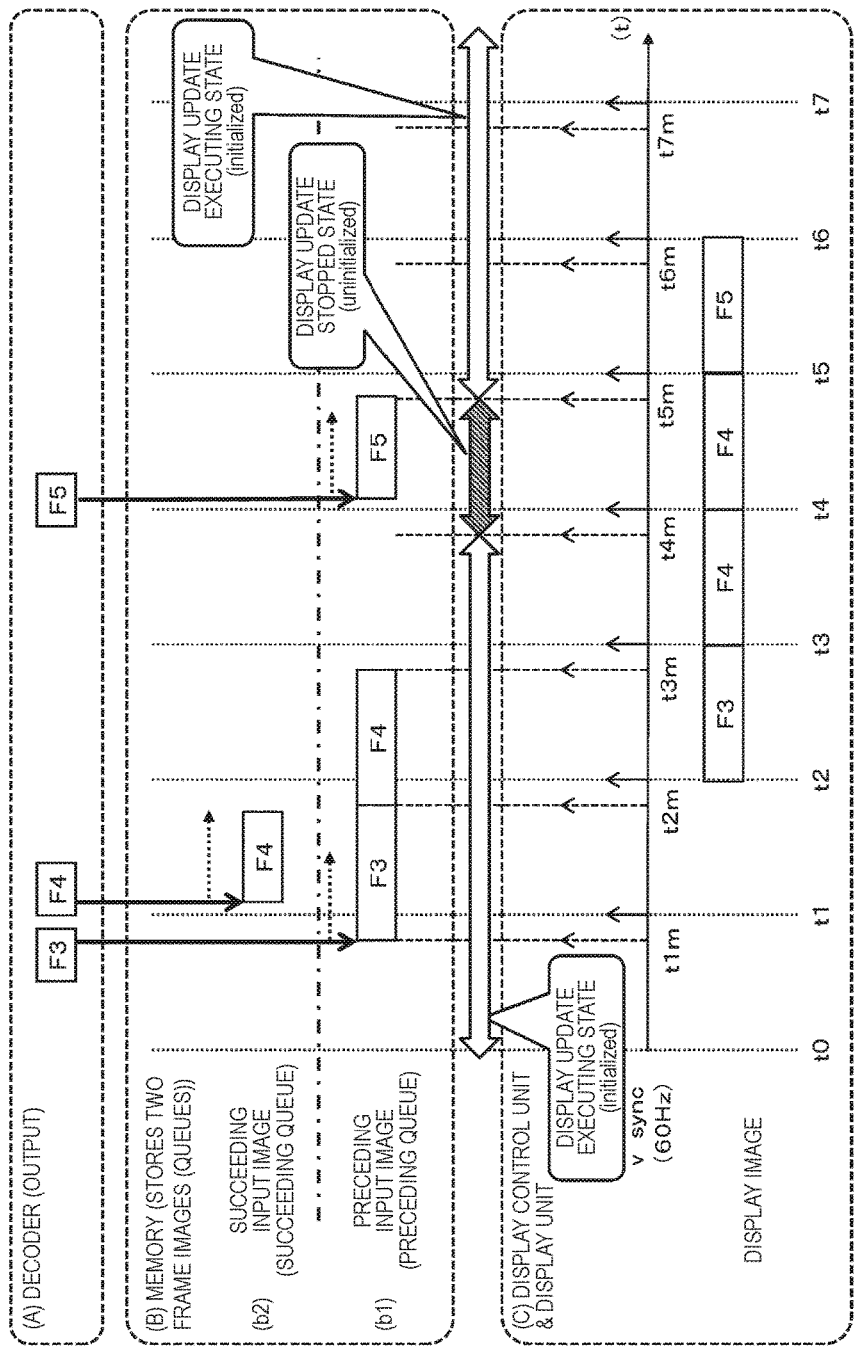
FIG. 13 is a diagram for describing a specific example of the image display control sequence in the display update executing state (initialized).

FIGS. 12 and 13 illustrate examples of processing in which the determination processing in step S256 is Yes, that is, in a case in which determination is made that the display image update processing start timing has come in state 2, that is, in the display update executing state (initialized) that has been described with reference to FIG. 11.

FIG. 12 is processing in which the determination processing in step S257 is No, that is, is processing in a case in which an unprocessed queue is left in the memory, and is an example of a sequence when the processing of steps S321 to S323 is executed.

Meanwhile, FIG. 13 is processing in which the determination processing in step S257 is Yes, that is, is processing in a case in which no unprocessed queue is left in the memory, and is an example of a sequence when the processing of steps S311 is executed.

Referring to FIG. 12, a sequence in a case in which an unprocessed queue is left in the memory and in a case in which the processing of step S321 to S323 is executed will be described first.

Similar to FIGS. 5 and 7 described earlier, FIG. 12 is a diagram illustrating a sequence associated with the transition of time from an output of data from the decoder 102 until display processing of the image frame on the display unit 104.

Each of the following data is illustrated in FIG. 12.

(A) An output of the decoder (B) Stored data in the memory (C) The image displayed on the display unit with the processing of the display control unit Time base (t) is illustrated in (C) of FIG. 12, and (A), (B), and (C) illustrates the processing performed in accordance with the time base (t).

Each of the F1, F2, F3, F4 . . . indicated in (A), (B), and (C) represents a single image frame.

F1 is an image frame F1, and F2 is an image frame F2.

Time t1, time t2, time t3 . . . depicted by solid line arrows on the time base (t) illustrated in (C) of FIG. 12 are each an output timing of the vertical synchronizing signal (Vsync) of the display unit 104 and each indicate a timing in which the relevant output image frame can be switched. When the vertical synchronizing signal (Vsync) is 60 Hz, the interval between each solid line arrow is 1/60 (sec).

Furthermore, time t1*m*, time t2*m*, time t3*m* . . . indicated by broken line arrows represents memory access timings to acquire images from the memory 121.

The memory 121 illustrated in (B) of FIG. 12 is the memory 121 illustrated in FIG. 4 and has a configuration that allows two image frames to be stored. In FIG. 12, (b1) on the lower side of (B) is a preceding input image (a preceding queue) and (b2) on the upper side is a succeeding input image (a succeeding queue).

In FIG. 12, State 1=display update stopped state (uninitialized) is during the period of t0 to t2*m* on the time base (t), and after t2*m*, is changed to State 2=display update executing state (initialized).

The above change in state is executed in the state change processing of step S211 in the flowchart illustrated in FIG. 8.

After changing the state, in State 2=display update executing state (initialized), processing of step S251 and after of the flow illustrated in FIG. 11 are executed.

In FIG. 12, processing of step S321 to S323 executed as the processing of Step S256 of the flow illustrated in FIG. 11 in which determination processing is Yes, that is, determination is made that the display image update processing start timing has come and, further, the processing of step S257 in which the determination processing is No, that is, processing in which an unprocessed queue is left in the memory will be described.

Time t3*m* indicated in FIG. 12 is the timing in which the determination processing in step S256 of the flow illustrated in FIG. 11 is Yes, in other words, is one of the timings on which determination is made that the display image update processing start timing has come.

When the determination processing in step S256 of the flow illustrated in FIG. 11 is Yes on the timing of time t3*m* illustrated in FIG. 12, in other words, when it is determined that the display image update processing start timing has come, the process proceeds to step S257.

In step S257, determination is made whether there is any unprocessed queue in the memory 121.

In the example illustrated in FIG. 12, at the display image update processing start timing t3*m*, as unprocessed queues on which no display processing has been performed, two queues, namely, the preceding queue (F3) and the succeeding queue (F4) exist in the memory 121.

Accordingly, the determination processing of step S257 is No, in other words, determination is made that there in an unprocessed queue in the memory 121, and the process proceeds to step S321.

In step S321, the preceding queue, which includes, as its component, the image frame F3 that is stored in the memory 121, is set as the image (tmp) subject to processing and is acquired from the memory 121 by the display control unit 122.

Subsequently, in step S322, the preceding queue, which includes, as its component, the image frame F3 that has already been acquired as the image (tmp) subject to processing, is deleted.

With the above processing, F4 that is the succeeding queue is set as the front queue.

Subsequently, in step S323, the display control unit 122 outputs, to the display unit 104, the image (tmp) subject to processing=F3 that has already been acquired from the memory 121 and executes the image update.

As described above, in State 2=display update executing state (initialized), when the display image update timing has come (step S256=Yes) and, further, when there is an unprocessed queue in the memory 121 (step S257=No), the processing of steps S321 to S323 is executed.

In other words, queues are sequentially fetched from the preceding queue stored in the memory 121 to perform display processing.

Referring to FIG. 13, an example of processing of step S311 that is executed as processing in a case in which the determination processing in step S257 is Yes, in other words, in a case in which there is no unprocessed queue left in the memory will be described next.

In the sequence diagram illustrated in FIG. 13, time t4*m* indicated in FIG. 13 is the timing in which the determination processing in step S256 of the flow illustrated in FIG. 11 is Yes, in other words, is one of the timings on which determination is made that the display image update processing start timing has come.

When the determination processing in step S256 of the flow illustrated in FIG. 11 is Yes on the timing of time t3*m* illustrated in FIG. 12, in other words, when it is determined that the display image update processing start timing has come, the process proceeds to step S257.

In step S257, determination is made whether there is any unprocessed queue in the memory 121.

In the example illustrated in FIG. 13, at the display image update processing start timing t4*m*, in the memory 121, there is no unprocessed queue on which no display processing has been performed.

Accordingly, the determination processing of step S257 is Yes, in other words, determination is made that there is no unprocessed queue in the memory 121, and the process proceeds to step S311.

Change in state is performed in step S311.

In other words, the state is set to State 1=display update stopped state (uninitialized) and the process is ended.

In the above case, the update of the display image on the display unit 104 is not executed. As illustrated in (C) of FIG. 13, the display image of the display unit 104 is set as F4, which is the display image between t3 and t4, without change from time t4 and after.

As described above, in State 2=display update executing state (initialized), when the display image update timing has come (step S256=Yes) and, further, when there is no unprocessed queue left in the memory 121 (step S257=Yes), the processing of step S311 is executed.

In other words, the update of the display image is not executed and the state change processing to the display update stopped state (uninitialized) is performed.

[6. Processing in Response to Switching of Image Transmission Frame Rate (fps) of Server]

Processing that is executed by the client when the image transmission frame rate (fps) of the server is switched will be described next.

Note that as described above, the server 30 appropriately changes the transmission frame rate in accordance with the congestion situation and the congested state of the network. For example, two rates of 60 fps and 30 fps are used while appropriately switching the two rates.

The transmission frame rate information of the server 30 is sequentially notified to the client 20. For example, in step S254 in the flow illustrated in FIG. 11, when change in the server transmission frame rate (fps) is detected, in step S255, the client 20 performs processing of resetting the vertical synchronizing signal (Vsync) of the display unit 104 and changing the display update timing.

Hereinafter, a description will be given on an example of processing of the client 20 in which there are two types of frame rates of the image transmitted by the server 30, namely, 60 fps and 30 fps, and the two transmission frame rates are switched.

[6-1. Basic Display Control Processing Executed by Client When Transmission Frame Rates (fps) are 60 fps and 30 fps]

Figure 14:
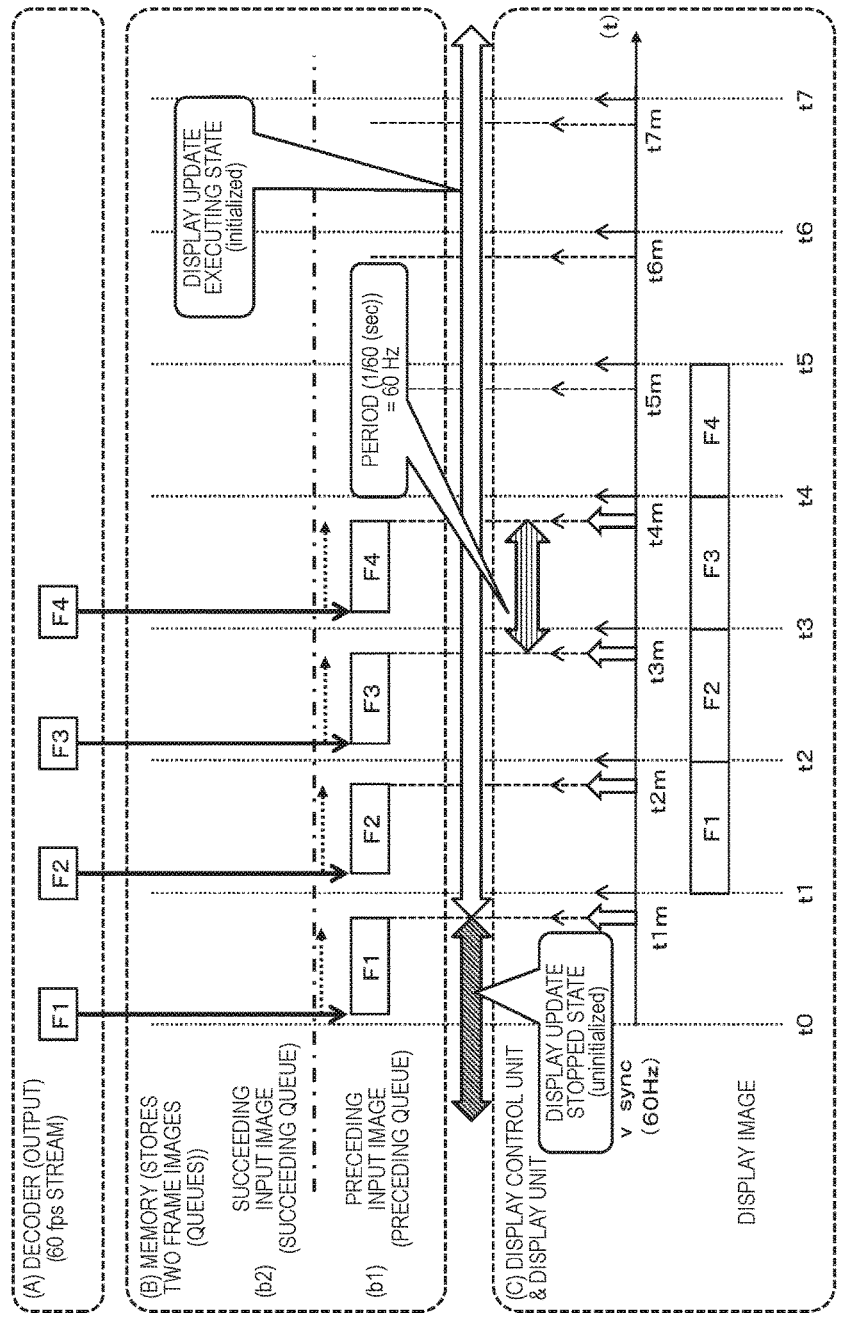
FIG. 14 is a diagram for describing a specific example of the image display control sequence in a case in which transmission frame rate=60 fps.
Figure 15:
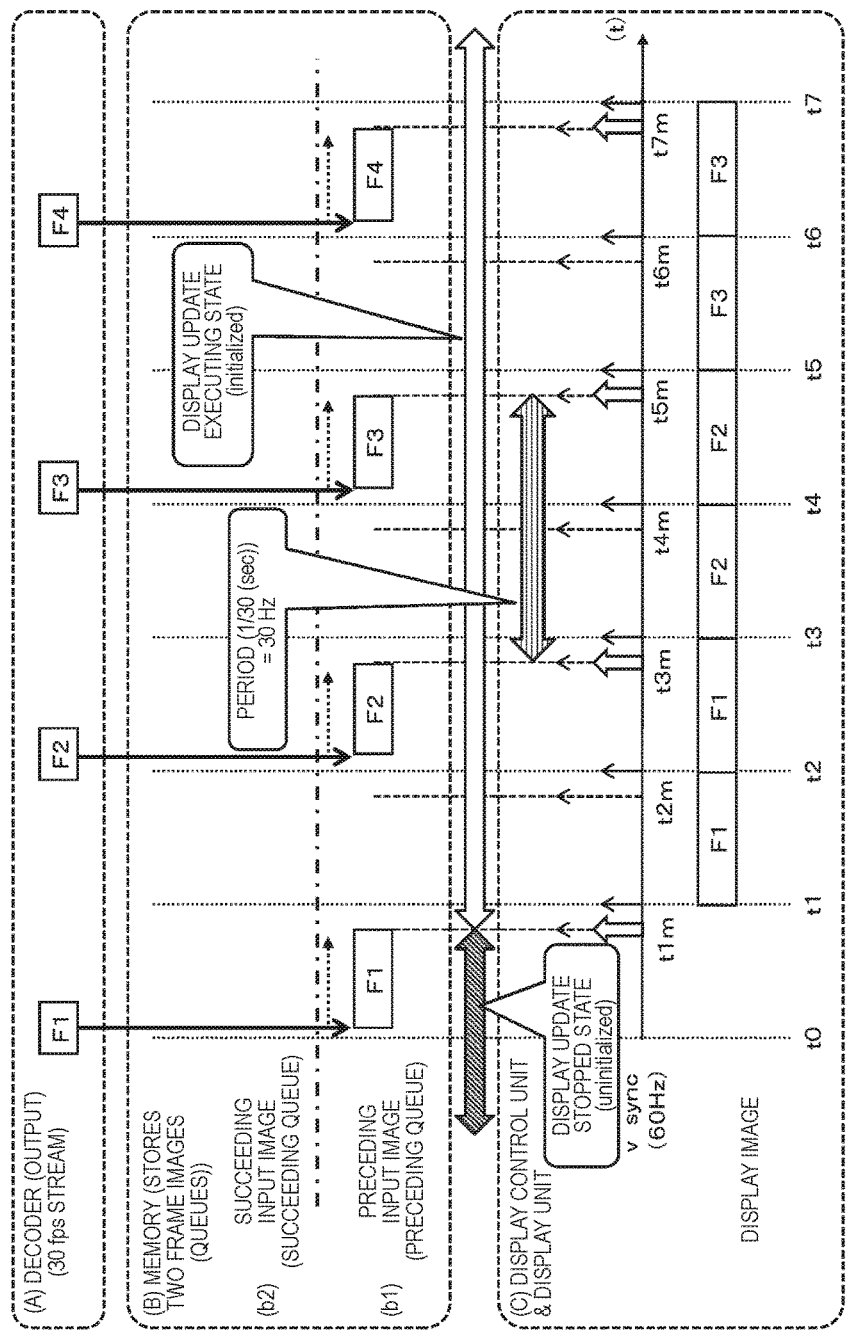
FIG. 15 is a diagram for describing a specific example of the image display control sequence in a case in which transmission frame rate=30 fps.

With reference to FIGS. 14 and 15, processing sequence of the client 20 when the frame rate of the image transmitted by the server 30 is 60 fps and that when 30 fps will be described next.

FIG. 14 illustrates the processing sequence of the client 20 when the frame rate of the image transmitted by the server 30 is 60 fps.

Similar to FIG. 5 and the like described earlier, each of the following data is illustrated in FIG. 14.

(A) An output of the decoder
(B) Stored data in the memory
(C) The image displayed on the display unit with the processing of the display control unit In the example illustrated in FIG. 14, the decoder output illustrated in (A) of FIG. 14 is substantially the same in intervals with the 60 fps that is the frame rate of the image transmitted by the server 30. In other words, a single image frame Fn is output each ⅟60 (sec) and is stored in the memory.

When the transmission frame rate information of the server 30 is input from the communication unit 101, the controller 105 illustrated in FIG. 4 notifies the above to the display control unit 122 of the output controller 103.

The display control unit 122 performs update processing of the display image according to the current image transmission frame rate (fps).

The example illustrated in FIG. 14 is processing in a case in which the transmission frame rate=60 fps and, in such a case, the display control unit 122 performs processing of counting the vertical synchronizing signal (Vsync≈60 Hz) of the display unit, and sequentially updating the image in accordance with the timing of Vsynvc=0.

FIG. 15 illustrates the processing sequence of the client 20 when the frame rate of the image transmitted by the server 30 is 30 fps.

Similar to FIG. 14 and the like described earlier, each of the following data is illustrated in FIG. 15.

(A) An output of the decoder
(B) Stored data in the memory
(C) The image displayed on the display unit with the processing of the display control unit In the example illustrated in FIG. 15, the decoder output illustrated in (A) of FIG. 15 is substantially the same in intervals with the 30 fps that is the frame rate of the image transmitted by the server 30. In other words, a single image frame Fn is output each ⅟30 (sec) and is stored in the memory.

In such a case, the display control unit 122 performs processing of counting the vertical synchronizing signal (Vsync≈60 Hz) of the display unit, and updating the image in accordance with the timing of Vsynvc=0 being counted for the second time.

In other words, the image update is performed each ⅟30 (sec) by counting the vertical synchronizing signal of 60 Hz.

[6-2. Display Control Processing Executed by Client When Transmission Frame Rates (fps) are Changed from 60 fps to 30 fps]

The server 30 appropriately changes the transmission frame rate in accordance with, for example, the congestion situation and the congested state of the network. When the network is congested and the bandwidth that can be used is limited, the frame rate is lowered. For example, processing of lowering the frame rate of 60 fps to 30 fps is performed.

Note that the notification of the change in the transmission rate is successively notified to the client 20 from the server 30.

The controller 105 of the client 20 illustrated in FIG. 4 outputs a metadata setting command to the decoder 102 on the basis of the notification information on the transmission rate change. In other words, as metadata of the decoded image frame Fn that the decoder 102 outputs, the transmission frame rate (fps) is set and is stored in the memory 121.

On the basis of the metadata set in the queue that has been fetched from the memory 121, the display control unit 122 detects that the transmission frame rate has been changed and, on the basis of the detection information, changes the display update rate of the image of the display unit 104.

Note that the display control unit determines whether there has been a change in the frame rate by retaining the metadata of the data acquired one data before from the memory and performing a comparison with the transmission frame rate (fps) information of the above preceding metadata.

Hereinafter, description of an example of the processing of the client when the image transmission frame rate (fps) from the server 30 is changed from 60 fps to 30 fps will be given.

Figure 16:
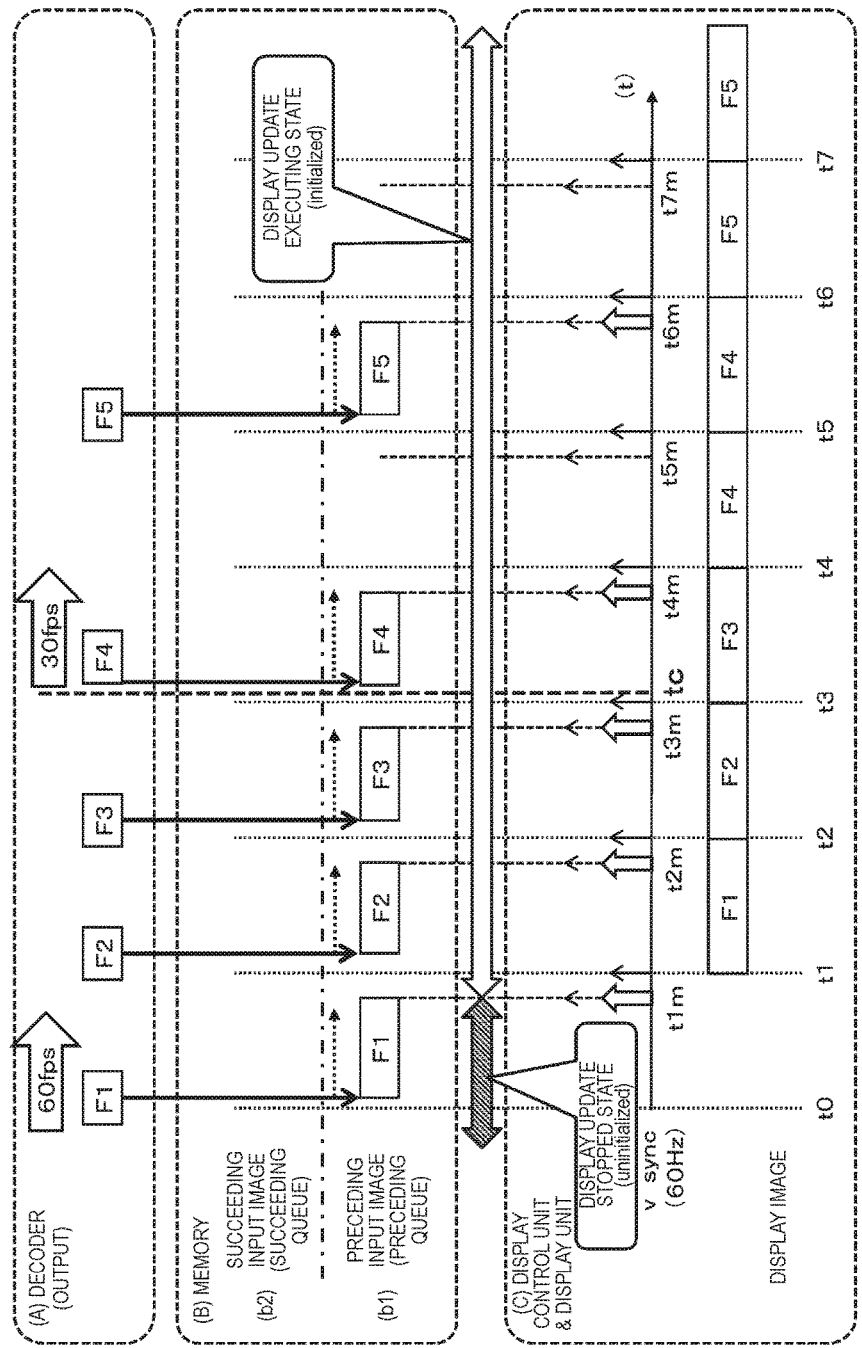
FIG. 16 is a diagram for describing a specific example of the image display control sequence in a case in which the transmission frame rate is changed from 60 fps to 30 fps.
Figure 17:
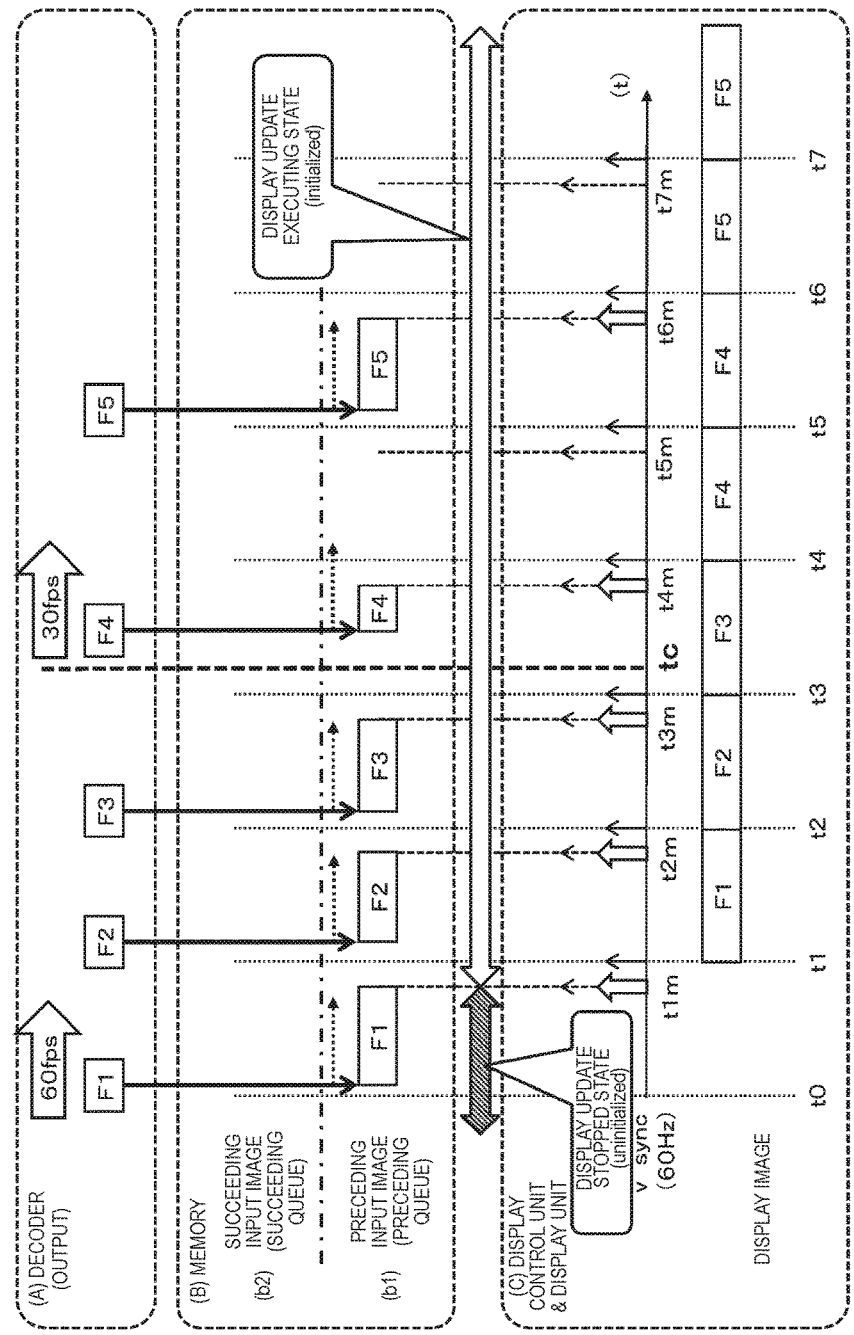
FIG. 17 is a diagram for describing a specific example of the image display control sequence in a case in which the transmission frame rate is changed from 60 fps to 30 fps.
Figure 18:
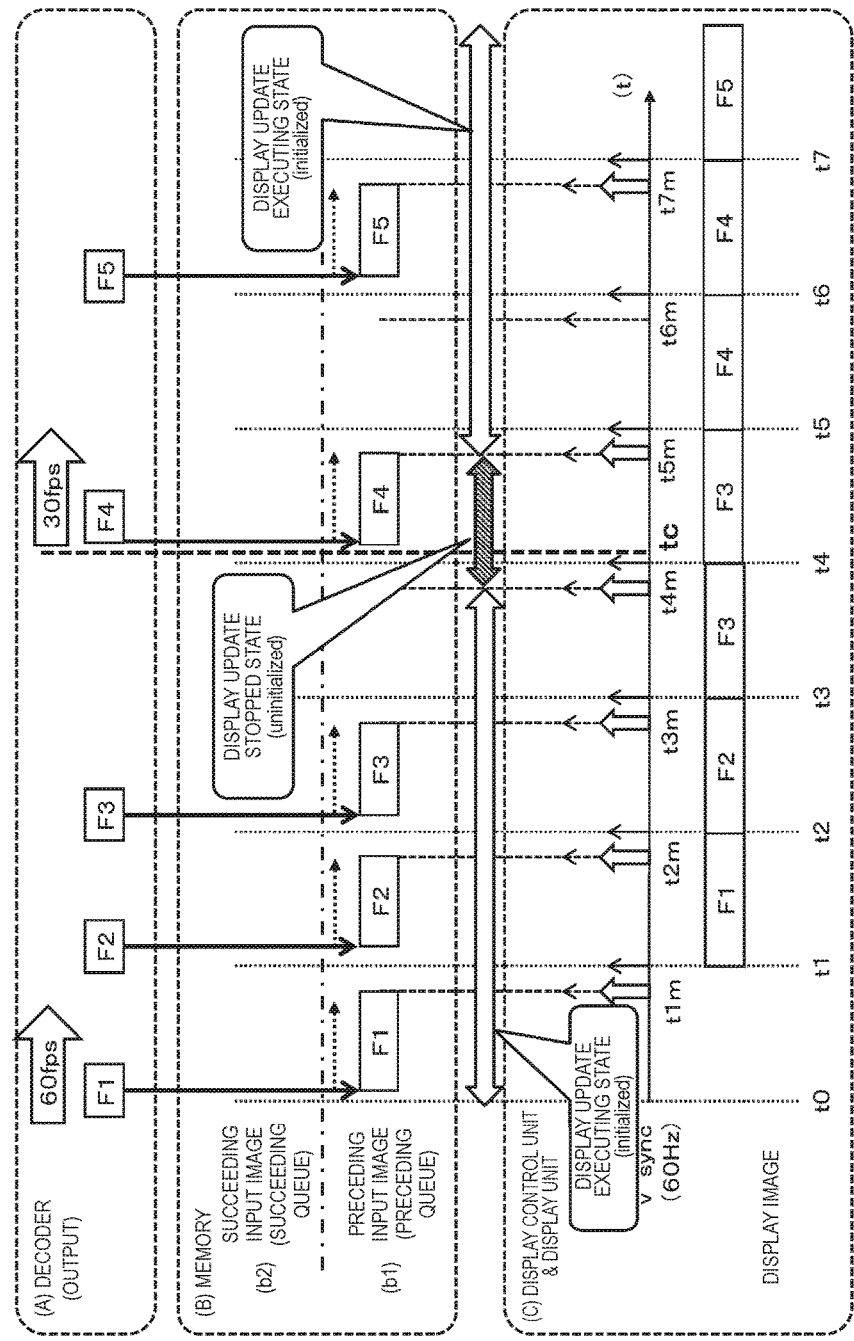
FIG. 18 is a diagram for describing a specific example of the image display control sequence in a case in which the transmission frame rate is changed from 60 fps to 30 fps.

Referring to FIGS. 16 to 18, description of the following specific examples will be given.

(Specific Example 1) An example of display control processing (FIG. 16) when there is an unprocessed image (undisplayed image), in which the buffering time has passed and that includes the frame rate change information, at the first display image update processing start timing (tnm) after the timing of the notification of the transmission rate reduction received by the client.

(Specific Example 2) An example of display control processing (FIG. 17) when there is no unprocessed image (undisplayed image), in which the buffering time has passed and that includes the frame rate change information, at the first display image update processing start timing (tnm) after the timing of the notification of the transmission rate reduction received by the client.

(Specific Example 3) An example of display control processing (FIG. 18) when the timing of the notification of the transmission rate reduction received by the client is within the state period of the display update stopped state (uninitialized) in which no unprocessed queue exists in the memory.

Note that similar to FIG. 5 and the like described earlier, the diagrams illustrated in FIGS. 16 to 18 each illustrate each of the following data.

(A) An output of the decoder
(B) Stored data in the memory
(C) The image displayed on the display unit with the processing of the display control unit Referring to FIG. 16, description of the following specific example 1 will be given first.

(Specific Example 1) An example of display control processing when there is an unprocessed image (undisplayed image), that includes the frame rate change information and in which the buffering time has passed, at the first display image update processing start timing (tnm) after the timing of the notification of the transmission rate reduction received by the client.

In FIG. 16, it is assumed that the client 20 receives the notification that the image frame rate (fps) transmitted by the server has been changed from 60 fps to 30 fps at time tc denoted on the time base (t) in (C) of FIG. 16.

At the first display image update processing start timing (t4m) after the time tc at which the notification of the frame rate reduction has been received, the buffering time of the image frame F4 which includes the frame rate change information has passed and an image F4 can be acquired from the memory.

When a notification of the frame rate reduction (60 fps→30 fps) is received at the timing tc denoted in FIG. 16, the display control unit 122 of the client 20 acquires the image frame F4, that includes the frame rate change information and in which the buffering time has passed, at the next display image update processing start timing (t4m).

On the basis of the metadata of the image frame F4, the reduction of the frame rate (60 fps→30 fps) is verified, and from this point, the display update timing is changed to 30 fps corresponding to the transmission frame rate.

As illustrated in (C) of FIG. 16, from the display image update processing start timing (t4m) of the image frame F4, the image update timing is changed to 30 fps from 60 fps until then. Specifically, update of the image is performed at every second signal timing of the vertical synchronizing signal (Vsync) of 60 Hz, in other words, at every 1/30 (sec).

Next, the following specific example 2 will be described with reference to FIG. 17.

(Specific Example 2) An example of display control processing when there is no unprocessed image (undisplayed image), in which the buffering time has passed and that includes the frame rate change information, at the first display image update processing start timing (tnm) after the timing of the notification of the transmission rate reduction received by the client.

In FIG. 17, it is assumed that the client 20 receives the notification that the image frame rate (fps) transmitted by the server has been changed from 60 fps to 30 fps at time tc denoted on the time base (t) in (C) of FIG. 17.

At the first display image update processing start timing (t4m) after the time tc at which the notification of the frame rate reduction has been received, the buffering time of the image frame F4 which includes the frame rate change information has not passed. Accordingly, when processing that takes buffer time into consideration is executed, the image F4 cannot be acquired from the memory.

However, in the display update executing state (initialized state), processing of acquiring and displaying an image that can be acquired from the memory 121 without taking buffering time into consideration is performed.

Accordingly, when a notification of the frame rate reduction (60 fps→30 fps) is received at the timing tc denoted in FIG. 17, the display control unit 122 of the client 20 acquires the newest input image frame F4 that includes the frame rate change information from the memory 121 at the next display image update processing start timing (t4m) and performs update of the display.

However, when an image frame F4 cannot be acquired, the image frame F3 is continuously displayed and the image frame F4 is acquired at the next display image update processing start timing (t5m) and performs update of the display.

When, at the display image update processing start timing (t4m), acquisition of the newest input image frame F4 that includes the frame rate change information from the memory 121 is succeeded and when the update of the display is executed, on the basis of the metadata of the image frame F4, the reduction of the frame rate (60 fps→30 fps) is verified by the display control unit 122, and from this point, the display update timing is changed to 30 fps corresponding to the transmission frame rate.

With the change in the frame rate. The image frame F4 is continuously displayed in the next 60 fps display image update processing start timing (t5m). At the next display image update processing start timing (t6m), the newest input image frame F5 is acquired and the update of the display is performed.

Accordingly, in the present example, processing of changing to 30 fps, which corresponds to the transmission frame rate, is performed at the display timing of the image frame F4 that has been acquired in success from the memory 121 and in which the buffering time has not passed.

Referring to FIG. 18, description of processing of specific example 3 will be described next.

(Specific Example 3) An example of display control processing when the timing of the notification of the transmission rate reduction received by the client is within the state period of the display update stopped state (uninitialized) in which no unprocessed queue exists in the memory.

In FIG. 18, it is assumed that the client 20 receives the notification that the image frame rate (fps) transmitted by the server has been changed from 60 fps to 30 fps at time tc denoted on the time base (t) in (C) of FIG. 18.

The reception time tc of the notification of the reduction in the frame rate is a time zone of the display update stopped state (uninitialized) in which no unprocessed queue exists in the memory.

At the display image update processing start timing (t4m) in the period during the display update stopped state (uninitialized), an image cannot be acquired from the memory and, during time t4 to time t5, the display image F3 of the time (t3 to t4) before time t4 to time t5 is continuously displayed.

At the next display image update processing start timing (t5m) after the reception time tc of the notification of the reduction in the frame rate, the newest input image frame F4, in which the buffering time has passed and that includes the frame rate change information, is acquired and update of the display is performed. From the image frame F4, the display update timing is changed to 30 fps that corresponds to the transmission frame rate.

Furthermore, at this point, the change in state, in other words, state change processing that changes to the display update executing state (initialized) is executed.

The above state change processing corresponds to the processing of step S211 in the flow illustrated in FIG. 8.

[6-3. Display Control Processing Executed by Client When Transmission Frame Rates (fps) are Changed from 30 fps to 60 fps]

The server 30 appropriately changes the transmission frame rate in accordance with, for example, the congestion situation and the congested state of the network. In a case in which the congestion is cleared and the bandwidth that can be used is increased, the frame rate is increased. For example, processing of increasing the frame rate of 30 fps to 60 fps is performed.

Note that the notification of the change in the transmission rate is successively notified to the client 20 from the server 30.

The controller 105 of the client 20 illustrated in FIG. 4 outputs a metadata setting command to the decoder 102 on the basis of the notification information on the transmission rate change. In other words, as metadata of the decoded image frame Fn that the decoder 102 outputs, the transmission frame rate (fps) is set and is stored in the memory 121.

On the basis of the metadata set in the queue that has been fetched from the memory 121, the display control unit 122 detects that the transmission frame rate has been changed and, on the basis of the detection information, changes the display update rate of the image of the display unit 104.

Hereinafter, description of an example of the processing on the client side when the image transmission frame rate (fps) from the server 30 is changed from 30 fps to 60 fps will be given.

Figure 19:
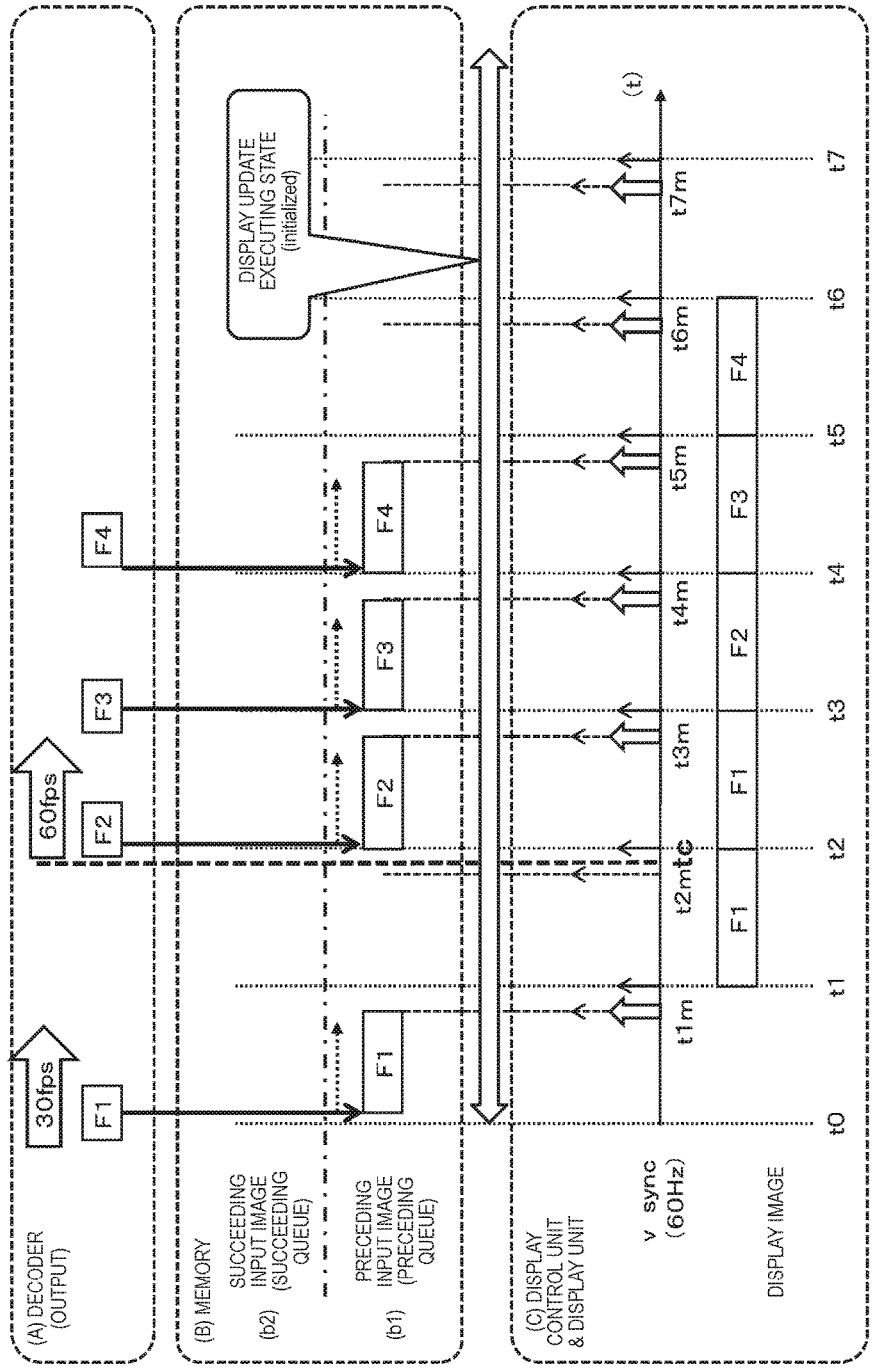
FIG. 19 is a diagram for describing a specific example of the image display control sequence in a case in which the transmission frame rate is changed from 30 fps to 60 fps.
Figure 20:
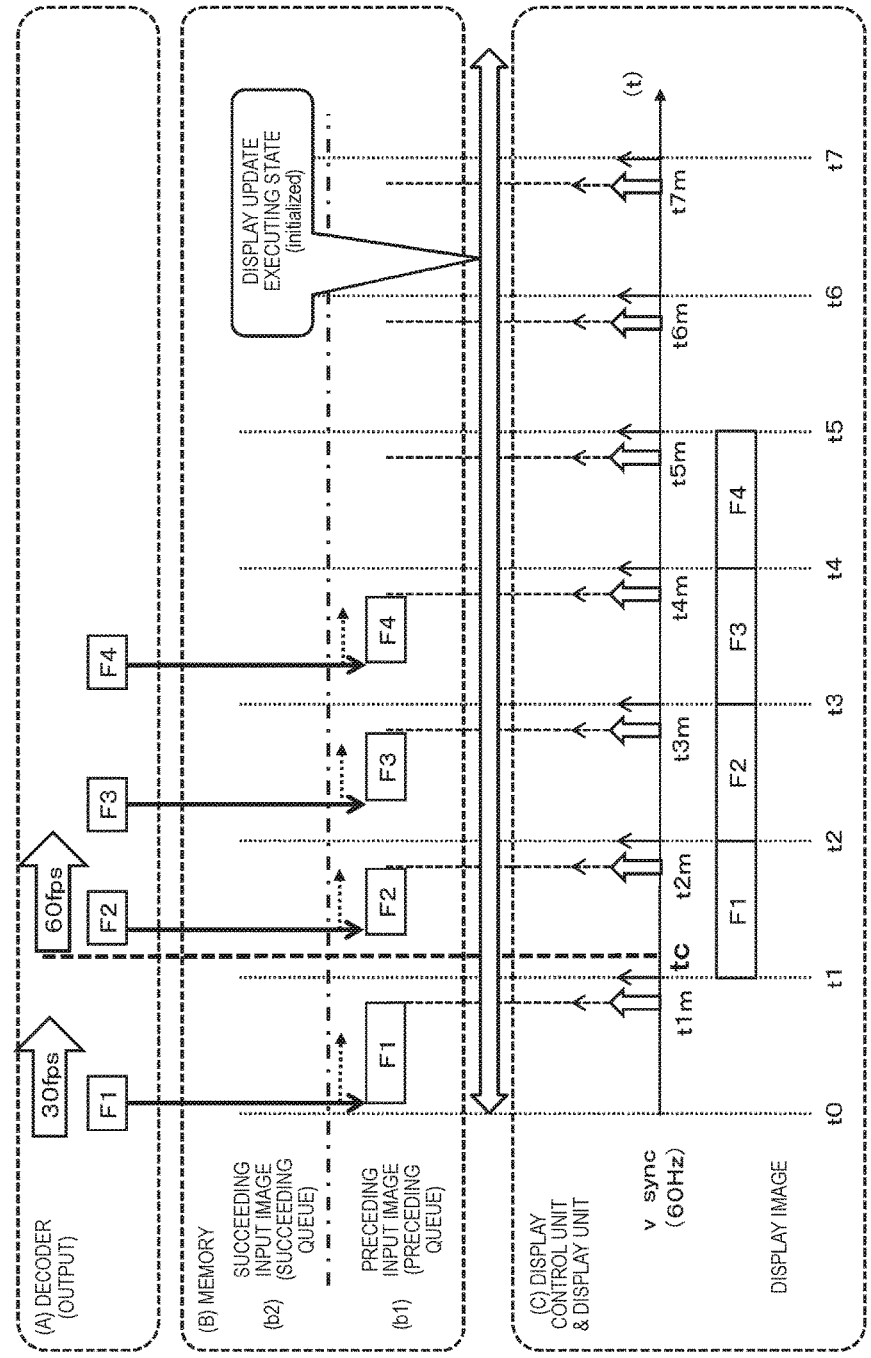
FIG. 20 is a diagram for describing a specific example of the image display control sequence in a case in which the transmission frame rate is changed from 30 fps to 60 fps.
Figure 21:
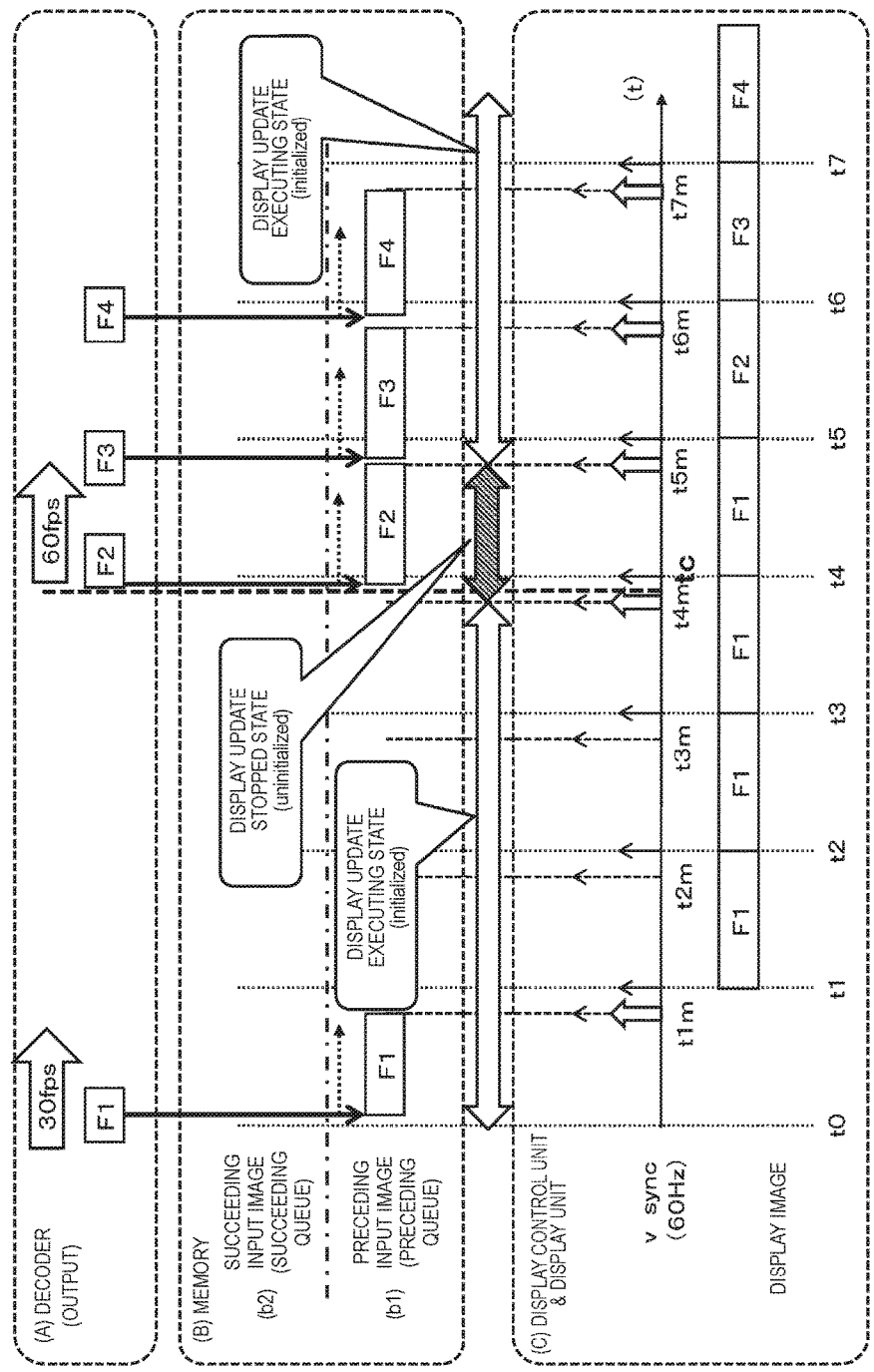
FIG. 21 is a diagram for describing a specific example of the image display control sequence in a case in which the transmission frame rate is changed from 30 fps to 60 fps.

Referring to FIGS. 19 to 21, description of the following specific examples will be given.

(Specific Example 1) An example of display control processing (FIG. 19) in a case in which the display image update processing start timing (tnm) of the image including the first frame rate change information after the timing of the notification of the increase in the transmission rate received by the client matches the timing of the display image update start timing when at a low frame rate (30 fps).

(Specific Example 2) An example of display control processing (FIG. 20) in a case in which the display image update processing start timing (tnm) of the image including the first frame rate change information after the timing of the notification of the increase in the transmission rate received by the client does not match the timing of the display image update start timing when at a low frame rate (30 fps).

(Specific Example 3) An example of display control processing (FIG. 21) in a case in which the timing of the notification of the increase in the transmission rate received by the client is in the state period of the display update stopped state (uninitialized) in which no unprocessed queue exists in the memory.

Note that similar to FIG. 5 and the like described earlier, the diagrams illustrated in FIGS. 19 to 21 each illustrate each of the following data.

(A) An output of the decoder
(B) Stored data in the memory
(C) The image displayed on the display unit with the processing of the display control unit Referring to FIG. 16, description of the following specific example 1 will be given first.

(Specific Example 1) An example of display control processing in a case in which the display image update processing start timing (tnm) of the image including the first frame rate change information after the timing of the notification of the increase in the transmission rate received by the client matches the timing of the display image update start timing when at a low frame rate (30 fps).

In FIG. 19, it is assumed that the client 20 receives the notification that the image frame rate (fps) transmitted by the server has been changed from 30 fps to 60 fps at time tc denoted on the time base (t) in (C) of FIG. 19.

The display image update processing start timing (t3m) of the image including the first frame rate change information after the time tc at which the notification of the frame rate increase has been received matches the display image update start timing when at a low frame rate (30 fps).

In the above case, the display control unit 122 of the client 20 acquires the image frame F2, in which the buffering time has passed at the display image update processing start timing (t3m) and that includes the frame rate change information, and on the basis of the metadata of the image frame F2, verifies that the transmission frame rate has been changed from 30 fps to 60 fps. On the basis of the verification, the display control unit 122 changes, from the image frame F2, the display update timing to 60 fps that corresponds to the transmission frame rate.

As illustrated in (C) of FIG. 19, from the display image update processing start timing (t3m) of the image frame F2, the image update timing is changed to 60 fps from 30 fps until then. Specifically, update of the image is performed at every signal timing of the vertical synchronizing signal (Vsync) of 60 Hz, in other words, at every 1/60 (sec).

Referring to FIG. 20, description of the following specific example 2 will be given first.

(Specific Example 2) An example of display control processing in a case in which the display image update processing start timing (tnm) of the image including the first frame rate change information after the timing of the notification of the increase in the transmission rate received by the client does not match the timing of the display image update start timing when at a low frame rate (30 fps).

In FIG. 20, it is assumed that the client 20 receives the notification that the image frame rate (fps) transmitted by the server has been changed from 30 fps to 60 fps at time tc denoted on the time base (t) in (C) of FIG. 20.

The first display image update processing start timing (t2m) after the time tc at which the notification of the frame rate increase has been received does not match the display image update start timing when at a low frame rate (30 fps).

However, at the display image update processing start timing (t2m), the image F2 in which the buffering time has already passed and that includes the frame rate change information is stored in the memory 121.

The display control unit 122 acquires the image frame F2, in which the buffering time has passed at the display image update processing start timing (t2m) and that includes the frame rate change information, and on the basis of the metadata of the image frame F2, verifies that the transmission frame rate has been changed from 30 fps to 60 fps.

The display control unit 122 changes, from the image frame F2 that has been acquired at the display image update processing start timing (t2m), the display update timing to 60 fps that corresponds to the transmission frame rate.

As illustrated in (C) of FIG. 20, from the display image update processing start timing (t2m) of the image frame F2, the image update timing is changed to 60 fps from 30 fps until then. Specifically, update of the image is performed at every signal timing of the vertical synchronizing signal (Vsync) of 60 Hz, in other words, at every 1/60 (sec).

In the present example, it is possible to promptly verify the change in the transmission rate and change the display rate at an earlier stage.

Referring to FIG. 21, description of processing of specific example 3 will be described next.

(Specific Example 3) An example of display control processing in a case in which the timing of the notification of the increase in the transmission rate received by the client is in the state period of the display update stopped state (uninitialized) in which no unprocessed queue exists in the memory.

In FIG. 21, it is assumed that the client 20 receives the notification that the image frame rate (fps) transmitted by the server has been changed from 30 fps to 60 fps at time tc denoted on the time base (t) in (C) of FIG. 21.

The reception time tc of the notification of the increase in frame rate is a time zone of the display update stopped state (uninitialized) in which no unprocessed queue exists in the memory.

At the display image update processing start timing (t4m) in the period during the display update stopped state (uninitialized), an image cannot be acquired from the memory and, during time t4 to time t5, the display image F1 of the time (t3 to t4) before time t4 to time t5 is continuously displayed.

At the next display image update processing start timing (t5m) after the reception time tc of the notification of the increase in the frame rate, the newest input image frame F2, in which the buffering time has passed and that includes the frame rate change information, is acquired and update of the display is performed. From the image frame F2, the display update timing is changed to 60 fps that corresponds to the transmission frame rate.

Furthermore, at this point, the change in state, in other words, state change processing that changes to the display update executing state (initialized) is executed.

The above state change processing corresponds to the processing of step S211 in the flow illustrated in FIG. 8.

[7. Exemplary Configuration of Information Processor Serving as Client]

Subsequently, an exemplary configuration of the information processor serving as the client will be described with reference to FIG. 22.

Figure 22:
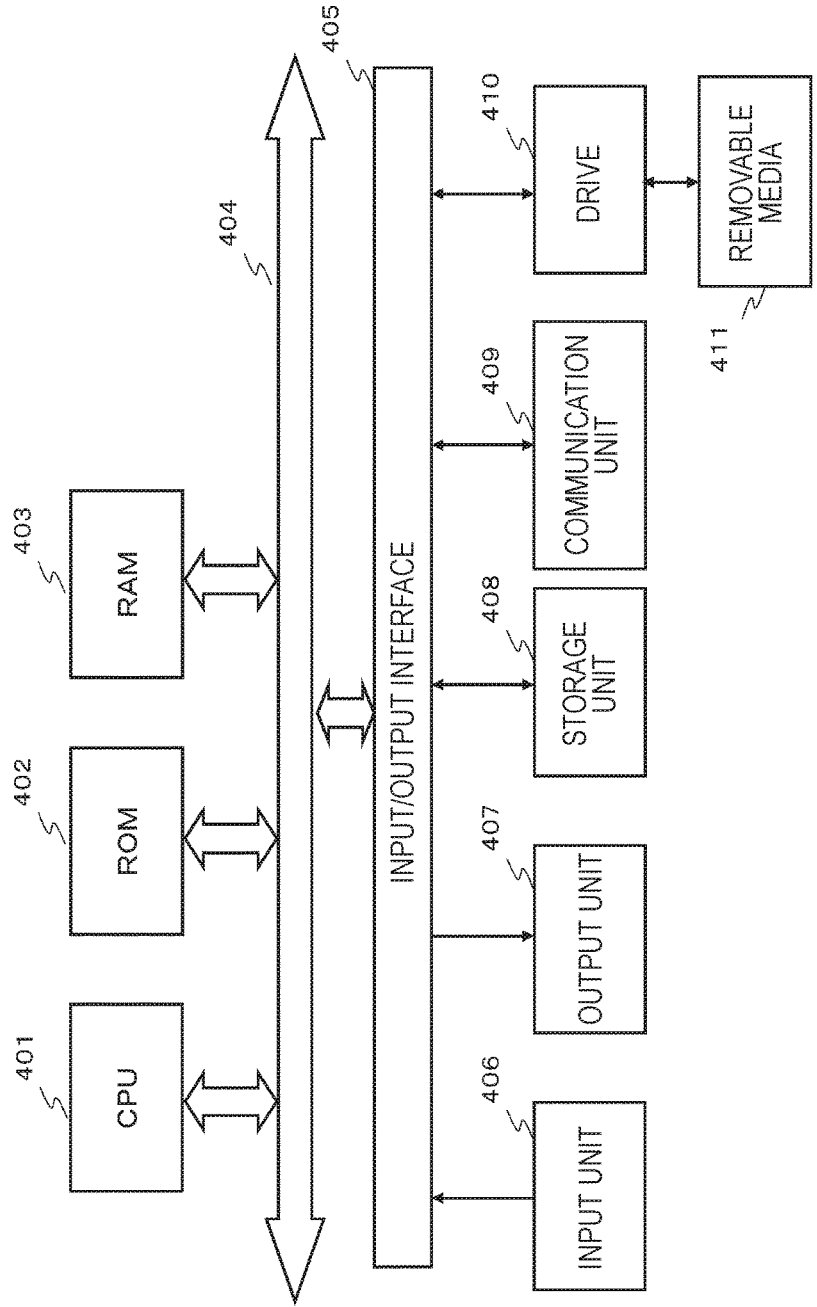
FIG. 22 is a diagram for describing an exemplary hardware configuration of an information processor serving as the client.

FIG. 22 illustrates an exemplary hardware configuration of the information processor serving as the client.

The central processing unit (CPU) 401 functions as a data processing unit that executes various processing in accordance to a program stored in a read-only memory (ROM) 402 or a storage unit 408. For example, the process according to the sequence described in the embodiment described above is executed. A program executed by the CPU 401 and data are stored in a random-access memory (RAM) 403. The CPU 401, the ROM 402, and the RAM 403 are interconnected with a bus 404.

The CPU 401 is connected to an input/output interface 405 through the bus 404, and an input unit 406 including various switches, a key board, a mouse, a microphone, and the like and an output unit 407 including a display, a loudspeaker and the like are connected to the input/output interface 405. The CPU 401 executes various processing in response to commands input from the input unit 406, and outputs the processing results to, for example, the output unit 407.

The storage unit 408 that is connected to the input/output interface 405 is, for example, configured of a hard disk or the like and stores a program that is executed by the CPU 401 and various data. A communication unit 409 functions as a transmission/reception unit of data communication through networks such as the Internet and a local area network and, further, functions as a transmission/reception unit of broadcast waves.

A drive 410 connected to the input/output interface 405 drives a removable media 411 such as a magnetic disk, an optical disc, a magneto-optical disk, or a semiconductor memory such as a memory card and executes recording or a read-out of data.

Not that while coding and decoding of data can be executed as a process of the CPU 401 serving as a data processing unit, the configuration may be such that a codec serving as a dedicated hardware for executing coding processing or decoding processing is provided.

[8. Conclusion of Configuration of Present Disclosure]

Referring to a specific embodiment, an embodiment of the present disclosure has been described above in detail. However, it is apparent that those skilled in the art may modify or replace the embodiment without departing from the scope of the present disclosure. In other words, the present disclosure has been disclosed by way of exemplification and limited interpretation thereof should not be made. In order to determine the scope of the present disclosure, the CLAIMS should be taken into consideration.

Additionally, the present technology may also be configured as below.

(1)

An information processor including:

a decoder configured to execute processing of decoding encoded image data received by a communication unit;

a memory configured to store an image frame that has already been decoded and that the decoder outputs; and a display control unit configured to acquire the image frame stored in the memory and output the image frame to a display unit, wherein the memory stores, in addition to the image frame, time in which the image frame has been input to the memory as metadata, and wherein the display control unit selects an output image to the display unit on a basis of elapsed time from the time of input.

(2)

The information processor according to (1), wherein the display control unit compares waiting time that is the elapsed time from the time of input to the memory and buffering time specified as required time to store data in the memory, and wherein the display control unit selects an image frame in which the waiting time exceeds the buffering time as an output image to the display unit.

(3)

The information processor according to (1) or (2), wherein the display control unit compares waiting time that is the elapsed time from the time of input to the memory and buffering time specified as required time to store data in the memory, and wherein the display control unit selects, as an output image to the display unit, a newest image frame in which the waiting time exceeds the buffering time when there are a plurality of image frames in which the waiting time exceeds the buffering time.

(4)

The information processor according to any of (1) to (3), wherein when there are a preceding stored image that is stored as a preceding queue and a succeeding stored image that is stored as a succeeding queue in the memory, the display control unit compares, in each queue, waiting time that is the elapsed time from the time of input to the memory and buffering time specified as required time to store data in the memory, and wherein the display control unit selects, among queues in which the waiting time exceeds the buffering time, an image frame corresponding to a newest queue as an output image to the display unit.

(5)

The information processor according to any of (1) to (4), wherein when it is not possible to acquire next data for display from the memory at an image update processing start timing of the display unit, the display control unit executes a continuous display of an image that is displayed and changes a device state to a display update stopped state.

(6)

The information processor according to (5), wherein, regarding the image frame stored in the memory, the display control unit compares, in the display update stopped state, waiting time that is the elapsed time from the time of input to the memory and buffering time specified as required time to store data in the memory, and wherein when the waiting time exceeds the buffering time, the display control unit selects the image frame as an output image to the display unit and wherein the display control unit changes the device state to a display update executing state.

(7)

The information processor according to any of (1) to (6), wherein the display control unit executes processing of switching a device state from a display update executing state to a display update stopped state, or from the display update stopped state to the display update executing state according to an acquisition state of data for display from the memory.

(8)

The information processor according to (7), wherein when the device state is the display update stopped state, the display control unit compares waiting time that is the elapsed time from the time of input to the memory and buffering time specified as required time to store data in the memory, and wherein the display control unit selects an image frame in which the waiting time exceeds the buffering time as an output image to the display unit.

(9)

The information processor according to (7) or (8), wherein when the device state is the display update executing state, the display control unit selects, without comparing waiting time that is the elapsed time from the time of input to the memory and buffering time specified as required time to store data in the memory with each other, an image frame that is capable of being acquired from the memory as an output image to the display unit regardless of whether or not the waiting time exceeds the buffering time.

(10)

The information processor according to any of (1) to (9), wherein the memory stores, in addition to the image frame, transmission frame rate information of the image frame as metadata, and wherein the display control unit determines whether there has been a change in a transmission frame rate by acquiring the transmission frame rate information that is set in the image frame acquired from the memory, and when there has been a change, the display control unit changes a display rate of the display unit in addition to the change in the transmission frame rate.

(11)

The information processor according to (10), wherein the display control unit compares waiting time that is the elapsed time from the time of input to the memory and buffering time specified as required time to store data in the memory, and wherein when an image frame in which the waiting time exceeds the buffering time is acquired from the memory and when the change in the transmission frame rate is verified on a basis of the metadata associated with the image frame that has been acquired, the display control unit changes the display rate of the display unit from the acquired image in addition to the change in the transmission frame rate.

(12)

The information processor according to (10), wherein the display control unit executes processing of switching a device state from a display update executing state to a display update stopped state, or from the display update stopped state to the display update executing state according to an acquisition state of data for display from the memory, wherein when the device state is the display update stopped state, the display control unit selects an image frame in which the waiting time exceeds the buffering time as an output image to the display unit, and wherein when the device state is the display update executing state, the display control unit selects an image frame that is capable of being acquired from the memory as an output image to the display unit regardless of whether or not the waiting time exceeds the buffering time.

(13)

An information processing method executed in an information processor, the information processing method including:

a decoding processing step in which a decoder executes processing of decoding encoded image data received by a communication unit;

an image frame storing step in which an output controller stores an image frame that has already been decoded and that is output by the decoder to a memory; and a display controlling step in which a display control unit acquires the image frame stored in the memory and outputs the image frame to a display unit, wherein the image frame storing step is executed as a step of storing in the memory, in addition to the image frame, time of input of the image frame to the memory as metadata, and wherein the display controlling step includes a step of selecting an output image to the display unit on a basis of elapsed time from the time of input.

(14)

A program for causing an information processor to execute information processing of:

a decoding processing step that makes a decoder execute processing of decoding encoded image data received by a communication unit;

an image frame storing step that makes an output controller store an image frame that has already been decoded and that is output by the decoder to a memory; and a display controlling step that makes a display control unit acquire the image frame stored in the memory and output the image frame to a display unit, wherein in the image frame storing step, the memory is made to store, in addition to the image frame, time of input of the image frame to the memory as metadata, and wherein in the display controlling step, an output image to the display unit is made to be selected on a basis of elapsed time from the time of input.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program. For example, the program can be installed in advance in a storage medium. In addition to being installed in a computer from the storage medium, the program can also be received through a network, such as a local area network (LAN) or the Internet, and can be installed in a storage medium such as a hard disk or the like that is built into the computer.

Note that the various types of processing that are described in this specification may not only be performed in a temporal sequence as has been described, but may also be performed in parallel or individually, in accordance with the processing capacity of the device that performs the processing or as needed. Furthermore, the system in this specification is not limited to being a configuration that logically aggregates a plurality of devices, all of which are contained within the same housing.

INDUSTRIAL APPLICABILITY

As described above, according to a configuration of an embodiment of the present disclosure, a device and a method are provided that is capable of display control of image data, which is received through a communication unit, with a small delay.

Specifically, an image frame, and memory input time and transmission frame rate information that serve as metadata are stored in the memory storing the image frame. The display control unit selects the image that is output to the display unit on the basis of the elapsed time from the input time information. The waiting time, which is the elapsed time from the input time, and the buffering time are compared with each other in each of the queues, and the image frame corresponding to the newest queue, which is a queue among the queues in which the waiting time exceeds the buffering time, is selected as the output image to the display unit. Furthermore, when there is a change in the transmission frame rate, the display rate of the display unit is changed in addition to the change in the transmission frame rate.

With the present configuration, a device and a method are provided that is capable of display control of image data, which is received through a communication unit, with a small delay.

REFERENCE SIGNS LIST 10 communication system
20 client
21 TV
22 PC
23 portable terminal
30 server
51 communication unit
52 decoder
53 output controller
54 display unit
55 controller
71 memory
72 display control unit
101 communication unit
102 decoder
103 output controller
104 display unit
105 controller
121 memory
122 display control unit
401 CPU
402 ROM
403 RAM
404 bus
405 input/output interface
406 input unit
407 output unit
408 storage unit
409 communication unit
410 drive
411 removable media

The invention claimed is:

1. An information processor, comprising:
a communication circuit configured to receive encoded image data;
a decoder configured to:
decode the encoded image data received by the communication circuit;
associate a first time with each of a plurality of decoded image frames of the decoded image data; and
output decoded image data based on the decode of the encoded image data;
a memory configured to store:
the plurality of decoded image frames of the decoded image data output by the decoder;
a preceding stored image of the plurality of decoded image frames as a preceding queue of a plurality of queues;
a succeeding stored image of the plurality of decoded image frames as a succeeding queue of the plurality of queues; and
metadata that includes the first time at which each of the plurality of decoded image frames is input to the memory, and transmission frame rate information of each of the plurality of decoded image frames, wherein each of the plurality of decoded image frames is input to the memory at the first time after the decode of the encoded image data; and
a display control circuit configured to:
determine an elapsed time from the first time as a waiting time based on the stored metadata;
compare the waiting time and a buffering time in each of the plurality of queues based on the preceding stored image and the succeeding stored image, wherein the buffering time is a time required to store data in the memory;
select one of the plurality of decoded image frames as an output image for display, wherein the selected one of the plurality of decoded image frames corresponds to a newest queue among the plurality of queues in which the waiting time exceeds the buffering time; and
control a display unit to display the output image based on the transmission frame rate information.

2. The information processor according to claim 1, wherein the display control circuit is further configured to:
control the display unit to continue the display of the output image, wherein the output image is displayed continuously based on non-acquisition of next data for display from the memory at an image update processing start time of the display unit; and
change a device state to a display update stopped state.

3. The information processor according to claim 2, wherein the display control circuit is further configured to:
compare, in the display update stopped state, the waiting time and the buffering time;
select the one of the plurality of decoded image frames, as the output image, based on the waiting time that exceeds the buffering time; and
change the device state to a display update executing state.

4. The information processor according to claim 1, wherein the display control circuit is further configured to switch a device state from at least one of:
a display update executing state to a display update stopped state, or
the display update stopped state to the display update executing state, wherein the switch of the device state is based on an acquisition state of first data for display from the memory.

5. The information processor according to claim 4, wherein the display control circuit is further configured to compare the waiting time with the buffering time based on the device state that is the display update stopped state.

6. The information processor according to claim 4, wherein the display control circuit is further configured to select the one of the plurality of decoded image frames regardless of whether the waiting time exceeds the buffering time.

7. The information processor according to claim 1, wherein the display control circuit is further configured to:
  determine a change in a transmission frame rate by acquisition of the transmission frame rate information that is set in the one of the plurality of decoded image frames; and
  change, based on the change in the transmission frame rate, a display rate of the display unit.

8. The information processor according to claim 7, wherein the display control circuit is further configured to:
  acquire the one of the plurality of decoded image frames, in which the waiting time exceeds the buffering time, from the memory; and
  change, based on a verification of the change in the transmission frame rate, the display rate of the display unit from the acquired one of the plurality of decoded image frames in addition to the change in the transmission frame rate,
  wherein the verification of the change in the transmission frame rate is based on the metadata associated with the one of the plurality of decoded image frames.

9. The information processor according to claim 7, wherein the display control circuit is further configured to:
  switch a device state from one of:
    a display update executing state to a display update stopped state, or
    the display update stopped state to the display update executing state,
    wherein the switch of the device state is based on an acquisition state of first data for display from the memory,
  select the one of the plurality of decoded image frames, in which the waiting time exceeds the buffering time as the output image to the display unit, based on the device state that is the display update stopped state; and
  select the one of the plurality of decoded image frames, as the output image to the display unit regardless of whether the waiting time exceeds the buffering time, based on the device state that is the display update executing state.

10. The information processor according to claim 1, wherein the memory is further configured to store the buffering time in advance.

11. The information processor according to claim 1, wherein the display control circuit is further configured to:
  retain the metadata of a previous image frame acquired before acquisition of the one of the plurality of decoded image frames;
  acquire the transmission frame rate information of the one of the plurality of decoded image frames;
  determine a change in a transmission frame rate based on a comparison between the transmission frame rate information of the one of the plurality of decoded image frames with transmission frame rate information of the previous image frame; and
  change a display rate of the display unit based on the change in the transmission frame rate.

12. The information processor according to claim 11, wherein the display rate of the display unit corresponds to a count of a vertical synchronizing signal of the display unit.

13. An information processing method, comprising:
  in an information processor that includes a communication circuit, a decoder, and a memory:
    receiving, by the communication circuit, encoded image data;
    decoding, by the decoder, the encoded image data received by the communication circuit;
    associating, by the decoder, a first time with each of a plurality of decoded image frames of the decoded image data;
    outputting, by the decoder, decoded image data based on the decoding of the encoded image data;
    storing, in the memory, the plurality of decoded image frames of the decoded image data output by the decoder, a preceding stored image of the plurality of decoded image frames as a preceding queue of a plurality of queues, a succeeding stored image of the plurality of decoded image frames as a succeeding queue of the plurality of queues, and metadata,
    wherein
      the metadata includes the first time at which each of the plurality of decoded image frames is input to the memory, and transmission frame rate information of the each of the plurality of decoded image frames, and
      each of the plurality of decoded image frames is input to the memory at the first time after the decoding of the encoded image data;
    determining an elapsed time from the first time as a waiting time based on the stored metadata;
    comparing the waiting time and a buffering time in each of the plurality of queues based on the preceding stored image and the succeeding stored image, wherein the buffering time is a time required to store data in the memory;
    selecting one of the plurality of decoded image frames as an output image for display, wherein the selected one of the plurality of decoded image frames corresponds to a newest queue among the plurality of queues in which the waiting time exceeds the buffering time; and
    controlling a display unit to display the output image based on the transmission frame rate information.

14. A non-transitory computer-readable medium having stored thereon, computer-executable instructions that when executed by a processor in a computer, cause the computer to execute operations, the operations comprising:
  receiving, by a communication circuit, encoded image data;
  decoding, by a decoder, the encoded image data received by the communication circuit;
  associating, by the decoder, a first time with each of a plurality of decoded image frames of the decoded image data;
  outputting, by the decoder, decoded image data based on the decoding of the encoded image data;

storing, in a memory, the plurality of decoded image frames of the decoded image data output by the decoder, a preceding stored image of the plurality of decoded image frames as a preceding queue of a plurality of queues, a succeeding stored image of the plurality of decoded image frames as a succeeding queue of the plurality of queues, and metadata, wherein
the metadata includes the first time at which each of the plurality of decoded image frames is input to the memory, and transmission frame rate information of each of the plurality of decoded image frames, and
each of the plurality of decoded image frames is input to the memory at the first time after the decoding of the encoded image data;

determining an elapsed time from the first time as a waiting time based on the stored metadata;

comparing the waiting time and a buffering time in each of the plurality of queues based on the preceding stored image and the succeeding stored image, wherein the buffering time is a time required to store data in the memory;

selecting one of the plurality of decoded image frames as an output image for display, wherein the selected one of the plurality of decoded image frames corresponds to a newest queue among the plurality of queues in which the waiting time exceeds the buffering time; and controlling a display unit to display the output image based on the transmission frame rate information.

* * * * *